US010929631B2

(12) United States Patent
Alameh et al.

(10) Patent No.: US 10,929,631 B2
(45) Date of Patent: Feb. 23, 2021

(54) FINGERPRINT SENSOR WITH PROXIMITY DETECTION, AND CORRESPONDING DEVICES, SYSTEMS, AND METHODS

(71) Applicant: Motorola Mobility LLC, Chicago, IL (US)

(72) Inventors: Rachid M Alameh, Crystal Lake, IL (US); Patrick J Cauwels, South Beloit, IL (US); Jarrett K Simerson, Glenview, IL (US); Paul Steuer, Hawthorn Woods, IL (US)

(73) Assignee: Motorola Mobility LLC, Chicago, IL (US)

( * ) Notice: Subject to any disclaimer, the term of this patent is extended or adjusted under 35 U.S.C. 154(b) by 249 days.

(21) Appl. No.: 15/867,775

(22) Filed: Jan. 11, 2018

(65) Prior Publication Data

US 2018/0137330 A1    May 17, 2018

Related U.S. Application Data

(62) Division of application No. 14/919,038, filed on Oct. 21, 2015, now Pat. No. 10,402,616.

(51) Int. Cl.
*G06K 9/00* (2006.01)
*G06F 1/3215* (2019.01)
*G06F 1/3234* (2019.01)

(52) U.S. Cl.
CPC ....... *G06K 9/00013* (2013.01); *G06F 1/3215* (2013.01); *G06F 1/3262* (2013.01); *G06F 2203/0338* (2013.01)

(58) Field of Classification Search
CPC . G06K 9/00013; G06F 1/3215; G06F 1/3262; G06F 2203/0338
See application file for complete search history.

(56) References Cited

U.S. PATENT DOCUMENTS

| | | | |
|---|---|---|---|
| 6,327,376 B1 | 12/2001 | Harkin | |
| 8,773,405 B1 | 7/2014 | Ryshtun | |
| 2001/0036297 A1 | 11/2001 | Ikegami et al. | |
| 2006/0129826 A1* | 6/2006 | Azuchi | G07C 9/37 713/176 |
| 2009/0318198 A1 | 12/2009 | Carroll | |
| 2013/0076485 A1* | 3/2013 | Mullins | G06F 21/32 340/5.83 |

(Continued)

OTHER PUBLICATIONS

Vazquez Colon, Maria , "Final OA", U.S. Appl. No. 14/919,020, filed Oct. 21, 2015; dated Feb. 6, 2018.

(Continued)

*Primary Examiner* — Maria E Vazquez Colon
(74) *Attorney, Agent, or Firm* — Philip H. Burrus, IV

(57) ABSTRACT

A method in an electronic device includes determining, with at least one proximity sensor component proximately located with a fingerprint sensor, that an object is proximately located with the fingerprint sensor. In response to this, the method includes transitioning the fingerprint sensor from a low-power or sleep mode to an active mode of operation. The method then detects, with the fingerprint sensor, the object touching the fingerprint sensor. The method also detects, with the fingerprint sensor, an action of the object along the fingerprint sensor. The method then performs a control operation as a function of the action.

20 Claims, 13 Drawing Sheets

(56) References Cited

U.S. PATENT DOCUMENTS

| | | |
|---|---|---|
| 2013/0129163 A1 | 5/2013 | Chung |
| 2013/0307818 A1 | 11/2013 | Pope |
| 2015/0146944 A1* | 5/2015 | Pi .............................. G06F 21/83 |
| | | 382/124 |
| 2015/0371074 A1 | 12/2015 | Lin |
| 2016/0004899 A1 | 1/2016 | Pi |
| 2016/0180184 A1 | 6/2016 | Vieta |
| 2016/0188023 A1* | 6/2016 | Chang .................... G09G 5/003 |
| | | 345/173 |
| 2016/0335471 A1 | 11/2016 | Alameh |
| 2017/0061193 A1 | 3/2017 | Young et al. |
| 2017/0140195 A1 | 5/2017 | Wang et al. |

OTHER PUBLICATIONS

Vazquez Colon, Maria, "Final Office Action", U.S. Appl. No. 14/919,038, filed Oct. 21, 2015; dated Jun. 25, 2018.

Vazquez Colon, Maria, "NonFinal OA", U.S. Appl. No. 14/919,038, filed Oct. 21, 2015; dated Jan. 2, 2019.

Vazquez Colon, Maria, "Notice of Allowance", U.S. Appl. No. 14/919,020, filed Oct. 21, 2015; dated Sep. 5, 2018.

Vazquez Colon, Maria, "Notice of Allowance", U.S. Appl. No. 14/919,038, filed Oct. 21, 2015; dated Jul. 10, 2019.

"Excelitas Technologies Corp.", "Digital Thermopiles"; DigiPile Family; www.excelitas.com, May 31, 2011, 4 pages.

Slaby, Jiri et al., "Fingerprint Sensor with Proximity Detection, and Corresponding Devices, Systems, and Methods", U.S. Appl. No. 14/919,020, filed Oct. 21, 2015.

Vazquez Colon, Maria, "Non-Final OA", U.S. Appl. No. 14/919,038, filed Oct. 21, 2015; dated Dec. 28, 2017.

Vazquez Colon, Maria E, "NonFinal OA", U.S. Appl. No. 14/919,020, filed Oct. 21, 2015; dated Jul. 27, 2017.

\* cited by examiner

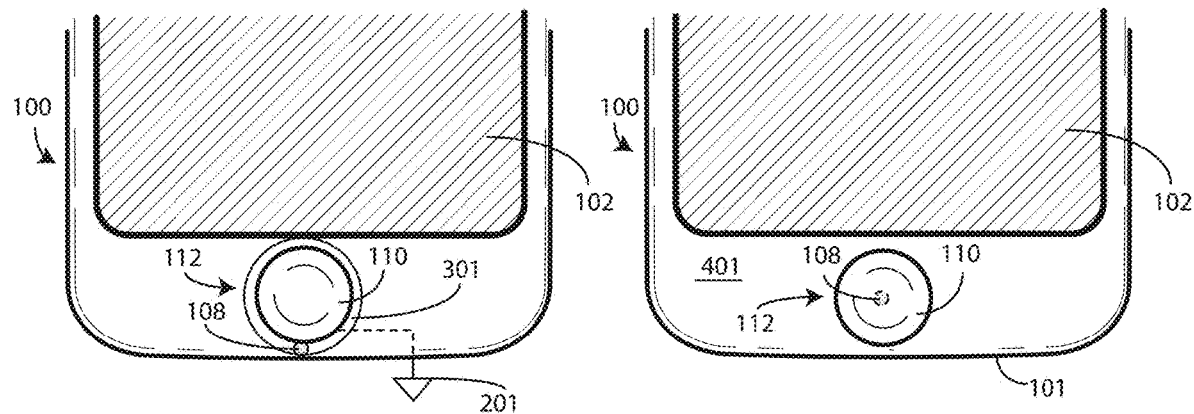
FIG. 2  FIG. 4
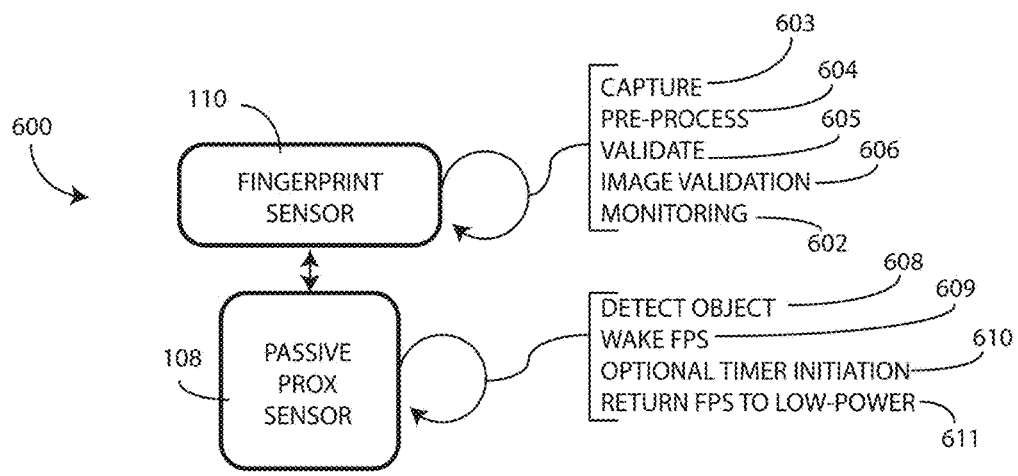
FIG. 6

FINGERPRINT SENSOR WITH PROXIMITY DETECTION, AND CORRESPONDING DEVICES, SYSTEMS, AND METHODS

CROSS REFERENCE TO PRIOR APPLICATIONS

This application is a divisional application from U.S. application Ser. No. 14/919,038, filed Oct. 21, 2015, which is incorporated by reference for all purposes.

BACKGROUND

Technical Field

This disclosure relates generally to electronic devices, and more particularly to portable electronic devices with biometric.

Background Art

Mobile electronic communication devices, such as mobile telephones, smart phones, gaming devices, and the like, are used by billions of people. The owners of such devices come from all walks of life. These owners use mobile communication devices for many different purposes including, but not limited to, voice communications, text messaging, Internet browsing, commerce such as banking, and social networking. The circumstances under which users of mobile communication device use their devices varies widely as well.

As these devices become more sophisticated, they can also become more complicated to operate. Designers are constantly working to find techniques to simplify user interfaces and operating systems to allow users to take advantage of the sophisticated features of a device without introducing complicated control operations. For example, some electronic devices are being equipped with biometric sensors. One example of this is the fingerprint sensor. Rather than requiring a user to go through a series of steps to unlock their device, a user imply touches or otherwise interacts with a biometric sensor to identify themselves to the device. Biometric sensors thus simplify device operation by replacing a series of several steps, and the requirement that user memorize a passcode, with a simple touch operation.

While the inclusion of devices such as biometric sensors can simplify complicated control operations, they are not without issues of their own. For example, they can consume large amounts of power when not in use. It would be advantageous to have an improved system having a biometric sensor, yet with reduced power consumption for extended battery life.

BRIEF DESCRIPTION OF THE DRAWINGS

FIGS. 2-5 illustrate explanatory fingerprint sensors proximately located with at least one proximity sensor component configurations in accordance with one or more embodiments of the disclosure.

FIG. 6 illustrates one explanatory functional schematic block diagram in accordance with one or more embodiments of the disclosure.

Figure 1:
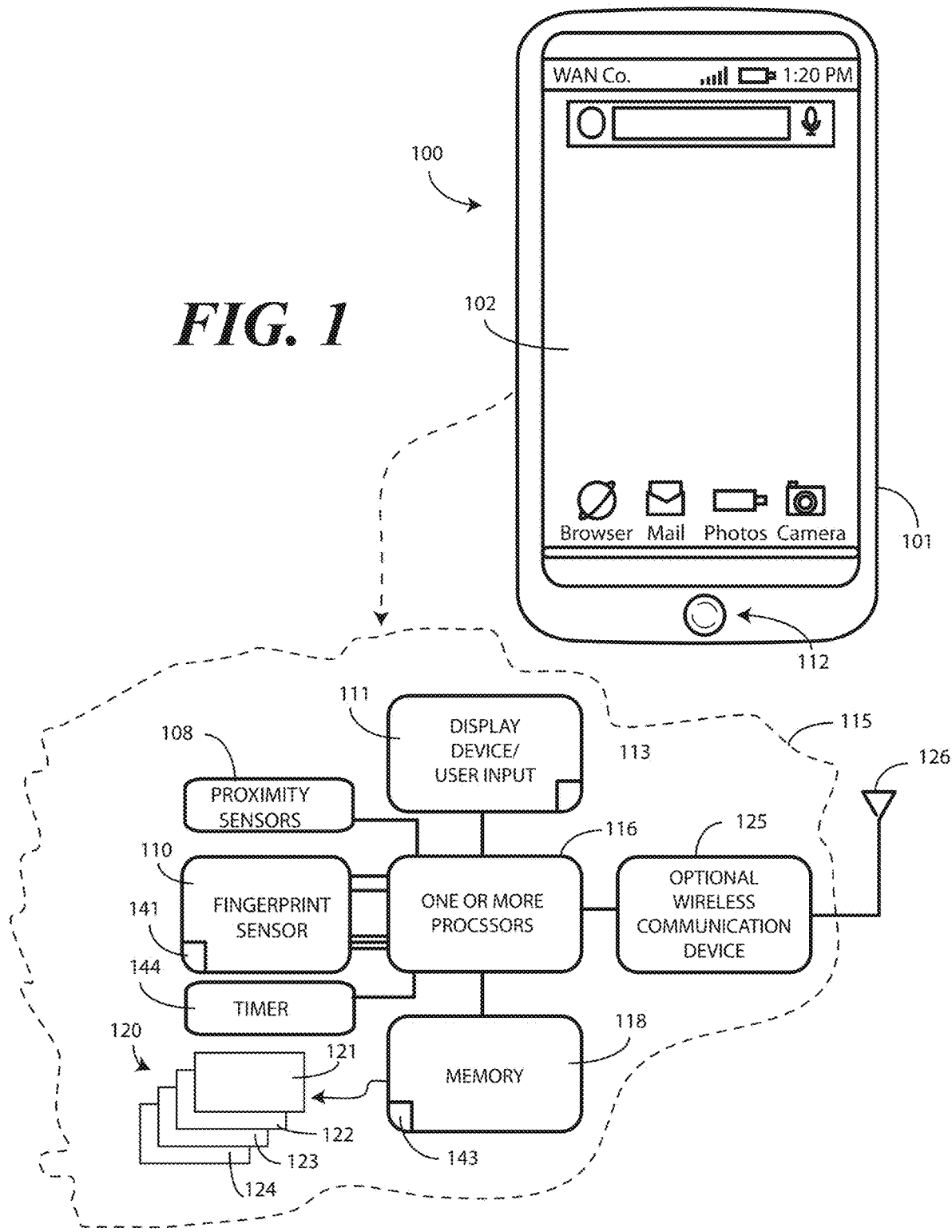
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using a fingerprint sensor proximately located with one or more proximity sensor components to control modes of operation of an electronic device. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by reducing power consumption, extending run time, and improving the overall user experience to overcome problems specifically arising in the realm of the technology associated with electronic device user interaction.

Alternate implementations are included, and it will be clear that functions may be executed out of order from that shown or discussed, including substantially concurrently or in reverse order, depending on the functionality involved.

Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of controlling fingerprint sensors and/or proximity sensors to control device operation as described herein. The non-processor circuits may include, but are not limited to, a radio receiver, a radio transmitter, signal drivers, clock circuits, power source circuits, and other user input devices. As such, these functions may be interpreted as steps of a method to perform device control in response to one or more proximity sensors components. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a proximity sensor component that is proximately located with a fingerprint sensor. In one embodiment, the at least one proximity sensor component comprises a receiver only, and does not include a corresponding transmitter. As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. In other embodiments, an optional infrared transmitter can be included to reflect signals off a user to the at least one proximity sensor component.

Illustrating by example, in one the proximity sensor component comprises a signal receiver to receive signals from objects external to the housing of the electronic device. In one embodiment, the signal receiver is an infrared signal receiver to receive an infrared emission from an object, such as a human being's finger, when the object is proximately located with the electronic device. In one or more embodiments, the proximity sensor component is configured to receive infrared wavelengths of about four to about ten micrometers. This wavelength range is advantageous in one or more embodiments in that it corresponds to the wavelength of heat emitted by the body of a human being. Additionally, detection of wavelengths in this range is possible from farther distances than, for example, would be the detection of reflected signals from the transmitter of a proximity detector component.

In one or more embodiments, one or more proximity sensor components are proximately located with the fingerprint sensor. As used here, "proximately" takes the ordinary English meaning of "close in space," as set forth in the New Oxford American Dictionary. In other embodiments, a proximity sensor component is concentrically located with the fingerprint sensor, with the proximity sensor component located at the center of the fingerprint sensor, with the fingerprint sensor and the proximity sensor component having a common center, with the fingerprint sensor surrounding the proximity sensor component.

Illustrating by example, in one embodiment a user interface comprises a touch sensor. The touch sensor includes a fingerprint sensor that has a thermally conductive band circumscribing the fingerprint sensor. In one or more embodiments, the thermally conductive band can take the shape of the perimeter of the fingerprint sensor. For example, if the fingerprint sensor is round, the thermally conductive band can comprise a thermally conductive ring. If the fingerprint sensor is rectangular, however, the thermally conductive band can be a square or rectangle. Thus, in one or more embodiments the shape of the thermally conductive band can be round, without corners. However, in other embodiments, the thermally conductive band can have a shape defined by one or more corners. Other shapes for the thermally conductive band will be obvious to those of ordinary skill in the art having the benefit of this disclosure.

In one embodiment, the thermally conductive band is manufactured from a thermally conductive metal, such as aluminum. In one embodiment, at least one proximity sensor component is collocated with the thermally conductive band. For example, the thermally conductive band can optionally include an aperture with a proximity sensor component situated within the aperture under the thermally conductive band. The thermally conductive band can, in one embodiment, be coupled to a ground node of electronic circuitry, where it advantageously provides electrostatic discharge protection. Second, the thermally conductive band can provide grounding protection and electromagnetic interference protection. Third, since the ring provides a conduit for thermal energy, it serves as a thermal conductor to the proximity sensor component. Where the aperture is included in the thermally conductive band, the aperture can be used for other functions, such as for a speaker port. In one or more embodiments, the proximity sensor component can sense the approach of a user's finger, and can transition the fingerprint sensor from a first mode of operation to a second mode of operation when this occurs. In one embodiment, a proximity sensor component and a fingerprint sensor are coupled to a common printed circuit board with the proximity sensor component and the fingerprint sensor in contact with each other.

In another embodiment, a proximity sensor component can be concentrically located with the fingerprint sensor. Since the surface of the fingerprint sensor can include a plurality of sensors disposed along a surface of the fingerprint sensor, in one embodiment the sensors surround the proximity sensor component so that the proximity sensor component can receive thermal energy without interference from the sensors of the finger print sensor. The fingerprint sensor can additionally optionally include an aperture to receive thermal energy from a user's finger. In other embodiments, there is no aperture and the fingerprint sensor serves as a thermal conductor to the proximity sensor component. In either case, the proximity sensor component can be used to transition the fingerprint sensor from a first mode of operation to a second mode of operation upon receiving an infrared emission from an object external to the housing.

Regardless of how the proximity sensor component(s) are physically configured relative to the fingerprint sensor, in one embodiment, when no user is around, the electronic device enters a low-power or sleep mode. When in this mode, using embodiments of the disclosure the fingerprint sensor and its associated circuitry can also be put into a low-power or sleep mode. Where the fingerprint sensor is in the low-power or sleep mode, it consumes very little—if any—power. However, in one or more embodiments, while the fingerprint sensor is in a low power or sleep mode, the proximity sensor component is in a fully active mode of operation. In one embodiment, the proximity sensor component comprises a single infrared signal receiver able to detect infrared emissions from a person. Accordingly, the proximity sensor component requires no transmitter since objects disposed external to the housing deliver emissions that are received by the infrared receiver. As no transmitter is required, the single proximity sensor component can operate at a very low power level. Simulations show that an infrared signal receiver can operate with a total current drain of just a few microamps.

When the infrared signal receiver receives an infrared emission from an object exterior to the housing of the electronic device, such as a user's hand or finger, in on embodiment one or the proximity sensor component is operable to actuate the fingerprint sensor to transition it from the low-power or sleep mode to an active mode of operation. Once awakened to the active mode of operation, the fingerprint sensor is operable to capture and store fingerprint data from a user's finger. One or more processors operable with the fingerprint sensor can then compare the fingerprint data to reference data stored in memory to determine whether the fingerprint data substantially matches the reference data, thereby authenticating the user.

Accordingly, by proximately locating a proximity sensor component with a fingerprint sensor, the fingerprint sensor can be placed into a low-power or sleep mode to save power. As soon as the proximity sensor component detects a warm object, such as a hand or finger, the fingerprint sensor can be activated for user authentication. The inclusion of a proximity sensor component allows an electronic device to distinguish proximity input, i.e., "touchless input," from touch input when a user's hand is in close proximity, e.g., a few inches, from the housing of the electronic device. The fingerprint sensor can be transitioned from a low-power mode to a full-power, authentication mode by the proximity sensor component.

By waking the fingerprint sensor only in the presence of warm objects, the inclusion of the proximity sensor component advantageously prevents false authentication attempts that can occur when an electronic device comes into contact with electrically conductive materials that are not a part of the user. This problem, present in prior art electronic devices having conventional fingerprint sensors, wastes power and processing power. When using embodiments of the disclosure, the fingerprint sensor only authenticates users when a warm object is nearby.

Embodiments of the disclosure contemplate that power savings—and thus longer runtime on a single battery charge—can be achieved by causing the fingerprint sensor to enter a low power or sleep mode when the proximity sensor component fails to detect infrared or thermal emissions. However, in one or more embodiments the proximity sensor component can remain in an operational state continually, even while the device and/or fingerprint sensor is not in use. To reduce overall latency, in one or more embodiments the proximity sensor component can cause the fingerprint sensor to transition to an active mode to capture fingerprint data before the finger actually touches the fingerprint sensor. Optionally, the fingerprint sensor can perform additional functions in the active mode of operation, such as one or more pre-processing steps on the fingerprint data while the main processors of the electronic device are in a low power or sleep mode. Once the pre-processing of the fingerprint data is confirmed, either an auxiliary processor or the main processors of the electronic device can authenticate the fingerprint data by comparing it to a reference file stored in memory.

Additional advantages are offered by embodiments of the disclosure. Many modern devices have user interfaces with a plurality of controls. For example, a modern smartphone may have a power button, two buttons to control volume (one to increase volume and one to decrease volume), a "belly" button configured as a large push button on a major face of the device, and a touch-sensitive display. Embodiments of the disclosure contemplate that each of these buttons provides an aperture along the housing of the electronic device through which water can enter the housing. Embodiments of the disclosure further contemplate that there is a desire to make more "durable" electronic devices, including those that can remain operational while submerged in water.

Accordingly, in one or more embodiments the disposition of a proximity sensor with a fingerprint sensor allows for control mechanisms using only this touch sensor. Illustrating by example, in one embodiment a method of controlling an electronic device includes determining, with at least one proximity sensor component proximately located with a fingerprint sensor, that an object—such as a user's finger—is proximately located with the fingerprint sensor. In response to this step of determining, the method can transition the fingerprint sensor from a low-power or sleep mode to an active mode of operation as previously described. Once this occurs, the method can include detecting, with the fingerprint sensor, that the object is touching the fingerprint sensor, and also detecting, with the fingerprint sensor, an action of the object along the fingerprint sensor. When an action is detected, one or more control circuits operable with the fingerprint sensor can perform a control operation as a function of the action.

The ability to deliver gestures to the fingerprint sensor, as confirmed by the proximity sensor component, allows the touch sensor to serve as the only user interface component other than the touch-sensitive display. The fingerprint sensor can be configured to be waterproof. Even when the thermally conductive band or the fingerprint sensor itself includes an aperture, the aperture can be covered with a thermally conductive film, such as a polyethylene film.

Since conventional buttons, such as the power button and volume control buttons can be removed, advantageously an electronic device can be configured with a single touch sensor, no buttons, and therefore as a waterproof device.

Illustrating by example, once the proximity sensor component wakes the fingerprint sensor, the fingerprint sensor can detect a user's touch, with confirmation provided by the proximity sensor component. (The proximity sensor component can confirm touch by detecting received thermal signals that saturate in one or more embodiments.) Once both the proximity sensor component and fingerprint sensor both confirm touch input, they can work in tandem to determine whether the touch input is stationary or in motion. Where the touch input is stationary for at least a predefined duration, this can cause a control operation to be performed. In one embodiment, the control operation is powering the device ON or OFF.

However, where the touch input is moving, the direction of motion can be used to control operation of the electronic device. Where the motion is in a first direction, such as moving along the fingerprint sensor in a vertical direction, this can be used to increase or decrease volume. However, where the motion is horizontal, this can be use for panning operations, such as for a "gallery" swipe to move from one photograph or website to another. Advantageously, embodiments of the disclosure provide an improved thermal approach compared to prior art devices. Further, the combination of a proximity sensor component and a fingerprint sensor in accordance with one or more embodiments of the disclosure allows a single touch sensor to control power button functionality, volume control, and gallery swipes, thereby eliminating the need for mechanical buttons. Other added benefits include the fact that a device can be configured to be waterproof and with a better appearance.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, in subsequent figures the electronic device 100 will be shown as a tablet computer. Other electronic devices suitable for use with embodiments of the disclosure include a conventional desktop computer, palm-top computer, a gaming device, a media player, or other device.

This illustrative electronic device 100 includes a display 102, which may optionally be touch-sensitive. In one embodiment where the display 102 is touch-sensitive, the display 102 can serve as a primary user interface of the electronic device 100. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a housing 101. In one embodiment, the housing 101 includes two housing members. A front housing member is disposed about the periphery of the display 102 in one embodiment. A rear-housing member forms the backside of the electronic device 100 in this illustrative embodiment and defines a rear major face of the electronic device.

In this illustrative embodiment, a touch sensor 112 is disposed along the front-housing member beneath the display 102. As will be described in more detail with reference to FIGS. 4 and 5 below, in one or more embodiments the touch sensor 112 includes at least one proximity sensor component 108 proximately disposed with a fingerprint sensor 110. For instance, in one embodiment the touch sensor 112 includes a fingerprint sensor 110, a thermally conductive band circumscribing the fingerprint sensor, and at least one proximity sensor component 108 collocated with the thermally conductive band. In another embodiment, the touch sensor 112 includes a fingerprint sensor 110 and a proximity sensor component 108 concentrically located with the fingerprint sensor 110, with the fingerprint sensor 110 comprising a plurality of sensors surrounding the proximity sensor component 108. Other physical architectures proximately locating the fingerprint sensor 110 with the proximity sensor component 108 will be obvious to those of ordinary skill in the art having the benefit of this disclosure. For example, while the touch sensor 112 is disposed beneath the display 102 in this embodiment, the touch sensor 112 could be collocated with the display 102 in other embodiments, thereby allowing the user to place a finger on the display 102 for identification or other device control.

In one or more embodiments, performance of the proximity sensor component 108 may be improved by providing an aperture to allow infrared or thermal emissions to reach the proximity sensor component 108. For example, where the proximity sensor component is collocated with a thermally conductive band circumscribing the fingerprint sensor 110, an aperture can be included in the thermally conductive band to allow thermal emissions to reach the proximity sensor component 108. Similarly, where the proximity sensor component 108 is concentrically located with the fingerprint sensor 110, an aperture can be created in the center of the fingerprint sensor 110 to allow thermal emissions to reach the proximity sensor component 108. Where it is desirable to include an aperture, but still desirable to create an electronic device 100 that is waterproof, the aperture can be covered with a thermally conductive film, such as a polyethylene film layer.

In one embodiment, the touch sensor 112 can be a single function device. In other embodiments, the touch sensor 112 can be a dual or multifunction device. Illustrating by example, in one embodiment the fingerprint sensor 110 of the touch sensor 112 is solely responsible for receiving biometric data from a user and either authenticating the user or determining that the user is unauthorized to use the electronic device 100. This would be a single function touch sensor.

In other embodiments, the touch sensor 112 may be capable of performing multiple functions. Again illustrating by example, in one embodiment the fingerprint sensor 110 can receive biometric data from a user and either authenticate the user or determine that the user is unauthorized to use the electronic device 100. However, the fingerprint sensor 110 may also be configured to detect motion along its surface. For example, in one or more embodiments one or more processors 116 operable with the fingerprint sensor 110 can be configured to detect motion of an object, such as a user's finger, along the surface of the fingerprint sensor 110.

In one or more embodiments, the one or more processors 116, operating in tandem with the fingerprint sensor 110, can detect an action of the object along the fingerprint sensor. Where such an action is detected, the one or more processors 116 can perform a control operation as a function of the action. Where, for instance, the action comprises the object remaining stationary for a predefined duration, the control operation can comprise one of powering the electronic device OFF or ON. Alternatively, where the action comprises movement of the object along the fingerprint sensor in a first direction, the control operation may comprise adjusting a volume of an audio output of the electronic device. Where the action comprises movement of the object along the fingerprint sensor in a second direction, the control operation may comprise a panning operation to alter a presentation on a display of the electronic device. Other actions and control operations occurring as a function of the action will be obvious to those of ordinary skill in the art having the benefit of this disclosure.

Thus, by touching the touch sensor 112 the user may deliver biometric data only. However, by touching the touch sensor 112 and then performing an action by moving a finger along the surface of the touch sensor 112, the touch sensor 112 may both authenticate the user by receiving the biometric data from touch input and perform a second function as a function of the action. This is in addition to the secondary functions of causing the fingerprint sensor 110 and/or one or more processors 116 to exit a low power or sleep mode when a user's finger approaches the electronic device 100 as detected by the at least one proximity sensor component 108.

Where the touch sensor 112 is a multifunction device, is instead a single function device, other user control such as push buttons may be omitted. This results in the electronic device 100 being able to be waterproof. This also results in the electronic device 100 having a better appearance without buttons. It should be noted that where the touch sensor 112 is a multifunction device, the inclusion of the touch sensor can be a "zero cost adder." This is true because when the fingerprint sensor 110 is a single function device, other push buttons must be included to control power, volume, and panning operations. Each of these buttons includes a cost, as does machining the housing to define apertures for the buttons. By including a proximity sensor component 108 that is proximately located with a fingerprint sensor 110 in a touch sensor 112, three buttons and three apertures in the housing can be eliminated. This elimination more than offsets the cost of the proximity sensor component 108 when only a single proximity sensor component 108 is used in the touch sensor 112. Cost analysis shows that the inclusion of a multi-function touch sensor 112 actually saves cost over prior art devices that include a single-function fingerprint sensor and three additional buttons.

In one embodiment, the electronic device 100 includes one or more connectors. However, where the electronic device 100 is to be waterproof, these connectors can be inductively coupled, thereby requiring no apertures. Such connectors can include those transmitting analog data, digital data, power, or combinations thereof.

A block diagram schematic 115 of the electronic device 100 is also shown in FIG. 1. In one embodiment, the electronic device 100 includes one or more processors 116. In one embodiment, the one or more processors 116 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 118, can optionally store the executable software code used by the one or more processors 116 during operation.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 125 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 125 can include wireless communication circuitry, one of a receiver, a transmitter, or transceiver, and one or more antennas 126.

The fingerprint sensor 110 is operable with the one or more processors 116 in one or more embodiments. In one embodiment, the fingerprint sensor 110 includes its own processor 141 to perform various functions, including detecting a finger touching the fingerprint sensor 110, capturing and storing fingerprint data from the finger, detecting user actions across a surface of the fingerprint sensor 110, performing at least one pre-processing step while the one or more processors 116 is in a low power or sleep mode, and upon receiving a request from the one or more processors 116 for the fingerprint data, delivering the fingerprint data to the one or more processors 116. In one or more embodiments the processor 141 of the fingerprint sensor 110 can, as one pre-processing step, perform a preliminary authentication of the user by comparing fingerprint data captured by the fingerprint sensor 110 to a reference file stored in memory 118. The processor 141 of the fingerprint sensor 110 can be an on-board processor. Alternatively, the processor 141 can be a secondary processor that is external to, but operable with, the fingerprint sensor in another embodiment. Other configurations will be obvious to those of ordinary skill in the art having the benefit of this disclosure.

In one embodiment, the fingerprint sensor 110 can include a plurality of sensors, which are shown in more detail with reference to FIG. 5 below. The fingerprint sensor 110 can be a complementary metal-oxide-semiconductor active pixel sensor digital imager or any other fingerprint sensor. The fingerprint sensor 110 can be configured to capture, with the plurality of sensors, a live scan of a fingerprint pattern from a finger disposed along its surface, and to store this information as fingerprint data from the user's finger. The fingerprint sensor 110 may also be able to capture one or more images with the plurality of sensors. The images can correspond to an area beneath a surface of skin. The fingerprint sensor 110 can compare the fingerprint data or skin images to one or more references to authenticate a user in an authentication process.

In one embodiment, one or more proximity sensor components 108 plurality of proximity sensor components 108 can be proximately located with the fingerprint sensor 110.

For instance, in one embodiment the touch sensor 112 includes a fingerprint sensor 110, a thermally conductive band circumscribing the fingerprint sensor, and at least one proximity sensor component 108 collocated with the thermally conductive band. In another embodiment, the touch sensor 112 includes a fingerprint sensor 110 and a proximity sensor component 108 concentrically located with the fingerprint sensor 110, with the plurality of sensors of the fingerprint sensor 110 surrounding the proximity sensor component 108. Some of these configurations will be illustrated below with reference to FIGS. 2-5. Still others will be obvious to those of ordinary skill in the art having the benefit of this disclosure.

In one embodiment, the proximity sensor component 108 or components are operable with the one or more processors 116. In one embodiment, the one or more proximity sensor components 108 comprise only signal receivers. In one embodiment, the one or more proximity sensor components 108 comprise a single proximity sensor component. In one embodiment, the proximity sensor component 108 comprises an infrared receiver. For example, in one embodiment the proximity sensor component 108 comprises one or more signal receivers that receive infrared wavelengths of about 860 nanometers.

In one embodiment, the proximity sensor component 108 has a relatively long detection range so as to detect heat emanating from a person's body when that person is within a predefined thermal reception radius. For example, the proximity sensor component may be able to detect a person's body heat from a distance of about ten feet in one or more embodiments. However, the signal receiver of the proximity sensor component 108 can operate at various sensitivity levels so as to cause the at least one proximity sensor component 108 to be operable to receive the infrared emissions from different distances. For example, the one or more processors 116 can cause the proximity sensor component 108 to operate another sensitivity, which is less than the first sensitivity, so as to receive infrared emissions from a second distance, which is less than the first distance. In other embodiments, the proximity sensor component 108 can be designed to have changing detection thresholds controlled by the one or more processors 116.

In one embodiment, the proximity sensor component 108 comprises an infrared signal receiver so as to be able to detect infrared emissions from a person. This is sometimes referred to as a "passive IR system" due to the fact that the person is the active transmitter. Accordingly, the proximity sensor component 108 requires no transmitter since objects disposed external to the housing deliver emissions that are received by the infrared receiver. As no transmitter is required, each proximity sensor component 108 can operate at a very low power level, which is typically less than ten microamps per sensor. Simulations show that a group of infrared signal receivers can operate with a total current drain of just a few microamps.

The one or more processors 116 can be responsible for performing the primary functions of the electronic device 100. For example, in one embodiment the one or more processors 116 comprise one or more circuits operable with one or more user interface devices, which can include the display 102, to present presentation information to a user. The executable software code used by the one or more processors 116 can be configured as one or more modules 120 that are operable with the one or more processors 116. Such modules 120 can store instructions, control algorithms, and so forth.

In one embodiment, the one or more processors 116 are responsible for running the operating system environment 121. The operating system environment 121 can include a kernel 122 and one or more drivers, and an application service layer 123, and an application layer 124. The operating system environment 121 can be configured as executable code operating on one or more processors or control circuits of the electronic device 100. The application layer 124 can be responsible for executing application service modules. The application service modules may support one or more applications or "apps." The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth.

In one or more embodiments, the fingerprint sensor 110 and the one or more processors 116 can be placed into a low power or sleep mode when the electronic device 100 is not in use. When the one or more processors 116 are in the low power or sleep mode, the display 102 may be OFF and the various applications will not be operational.

By contrast, in one or more embodiments when the fingerprint sensor 110 is in the low power or sleep mode, the proximity sensor component 108 may be left in a continually operational mode. Said differently, in one or more embodiments the proximity sensor component 108 is to operate in an operational mode while the fingerprint sensor 110 is in the low power or sleep mode to conserve power. As the proximity sensor component 108 consumes relatively low power, battery life and overall device runtime are extended.

The proximity sensor component 108 is configured to detect a finger or other object within a predetermined distance, such as a few inches, from the fingerprint sensor 110. When the infrared sensor of the proximity sensor component 108 receives infrared emissions from a warm object external to the housing 101, such as a user's finger, the one or more proximity sensor components 108 are to actuate the fingerprint sensor 110. In one embodiment, the one or more proximity sensor components 108 actuate the fingerprint sensor 110 by transitioning the fingerprint sensor 110 from the low power or sleep mode to an active mode of operation. When in the active mode of operation, the fingerprint sensor 110 is to capture and store fingerprint data from the finger. The fingerprint sensor 110 can optionally detect user actions across the fingerprint sensor 110, such as those described below with reference to FIGS. 13-16. Either the processor 141 of the fingerprint sensor 110, or alternatively the one or more processors 116, can compare the fingerprint data to reference data 143 stored in the memory 118 to determine whether the fingerprint data substantially matches the reference data to authenticate a user.

In one or more embodiments, the proximity sensor component 108 can optionally arm the fingerprint sensor 110 upon receiving an infrared emission from an object external to the housing, as well as actuate the one or more processors 116 prior to a user touching the fingerprint sensor 110. For example, when the electronic device 100 is unlocked and operational, there may be little or no need for biometric authentication via the fingerprint sensor 110. Accordingly, the one or more processors 116 may disarm the biometric authentication. Where the fingerprint sensor 110 is a dual or multifunction device, secondary or other functionality may remain operational when the biometric authentication function is disarmed. For instance, a user may still be able to perform actions across the surface of the fingerprint sensor 110 to control volume, perform gallery swipes, or turn the electronic device 100 OFF. Alternatively, a user may be able to make gestures above the touch sensor 112 to, for example, take a photograph. In many instances when the one or more processors 116 enter the low power or sleep mode, they may lock the electronic device 100 and the fingerprint sensor 110 to conserve power. Accordingly, in one or more embodiments the proximity sensor component 108 arms and/or activates the fingerprint sensor 110 upon receiving thermal emissions from an object external to the housing.

In one embodiment, the electronic device 100 can include a timer 144. In one embodiment, when the proximity sensor component 108 receives an infrared emission, and the proximity sensor component 108 transitions the fingerprint sensor 110 to the active mode of operation, any of the proximity sensor component 108, the one or more processors 116, or the processor 141 of the fingerprint sensor 110 can initiate the timer 144. If the fingerprint sensor 110 fails to capture and store the fingerprint data prior to expiration of the timer 144, the fingerprint sensor 110 can transition back to the low power or sleep mode. Including the timer 144 ensures that the fingerprint sensor 110 does not stay ON where, for example, a user merely passes a hand over the electronic device 100 and triggering the proximity sensor component 108.

Figure 3:
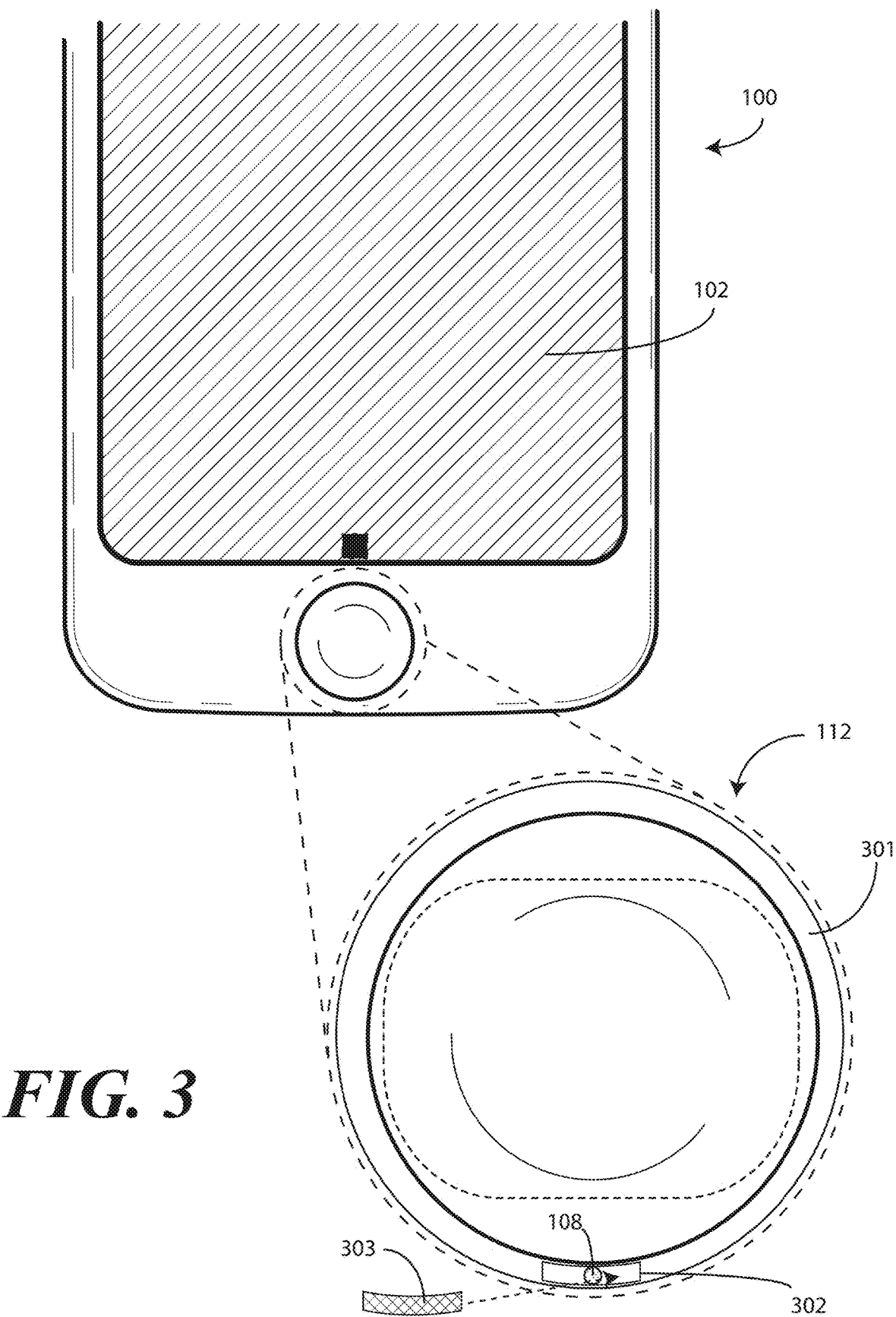

Turning now to FIGS. 2-5, illustrated therein are various explanatory fingerprint sensor and proximity sensor component configurations. Beginning with FIGS. 2-3, illustrated therein is a user interface (111) of the electronic device 100 comprising a first embodiment of a touch sensor 112. In this illustrative embodiment, the touch sensor 112 comprises a fingerprint sensor 110, a thermally conductive band 301, and at least one proximity sensor component 108. In this illustrative embodiment, the thermally conductive band 301 circumscribes the fingerprint sensor 110, and the at least one proximity sensor component 108 is collocated with the thermally conductive band 301. In one embodiment, the thermally conductive band 301 is manufactured from a material that serves as a conduit for thermal energy reaching the thermally conductive band 301 from exterior of the housing (101) of the electronic device 100 to the at least one proximity sensor component 108. For example, the thermally conductive band 301 can be manufactured from a thermally conductive metal such as steel or aluminum. Thus, in one or more embodiments the thermally conductive band 301 comprises an aluminum ring.

In one embodiment, the at least one proximity sensor component 108 is disposed beneath the thermally conductive band 301. As such, the thermally conductive band 301 defines a thermal conduit between a surface of the thermally conductive band and the at least one proximity sensor component 108. Where so configured, the thermally conductive band 301 can translate thermal energy, by functioning as a heat conductor, from a user's finger when it touches or otherwise warms the thermally conductive band 301. Such an embodiment is shown in FIG. 2. Note that while a single proximity sensor component 108 is shown in FIG. 2, in other embodiments multiple proximity sensor components can be used.

In another embodiment, the thermally conductive band 301 can define an aperture 302 to allow thermal energy to pass directly to the proximity sensor component 108. Such an embodiment is shown in FIG. 3. This configuration allows the proximity sensor component 108 to detect an approaching finger from farther distances. In this illustrative embodiment, the at least one proximity sensor component 108 is collocated with the at least one aperture 302. Note that while a single aperture 302 and a single proximity sensor component 108 is shown in FIG. 3, in other embodiments multiple apertures and proximity sensor components can be used.

Where the aperture 302 is included, it can provide other benefits as well. For example, in one embodiment the user interface (111) of the electronic device 100 also includes an audio output device (113), such as a loudspeaker, that is operable with the one or more processors (116). Where this is the case, the aperture 302 can define an acoustic port for the audio output device (113). Where the user interface (111) of the electronic device includes a microphone or audio input device, the acoustic port can be used for the audio input device instead of, or in addition to, serving as an acoustic port for the audio output device (113).

Where it is desirable to make the electronic device 100 waterproof, and the aperture 302 is included, the aperture can optionally be covered with a thermally transmissive film layer 303 to prevent the ingress of water or other liquids. In one embodiment, the thermally transmissive film layer 303 comprises a polyethylene film layer. Accordingly, in one or more embodiments the touch sensor 112 includes a thermally transmissive film layer 303 spanning the at least one aperture 302.

In one or more embodiments, the thermally conductive band 301 can be coupled to a ground node 201 of the electronic device 100. Advantageously, this allows the thermally conductive band 301 to define one or more of an electrostatic shield for the at least one proximity sensor component 108 or an electromagnetic shield for the at least one proximity sensor component 108. Accordingly, in one or more embodiments the inclusion of the thermally conductive band 301 can serves multiple purposes: first, it can provide electrostatic discharge protection for one or both of the fingerprint sensor 110 and the proximity sensor component 108. Second, it can provide grounding and/or electromagnetic interference protection for one or both of the fingerprint sensor 110 and the proximity sensor component 108. Third, the thermally conductive band 301 can serve as a heat conductor to translate thermal energy to the proximity sensor component 108. Fourth, where desired, the aperture 302 of the thermally conductive band 301 can serve as a speaker port as previously described.

In the illustrative embodiment of FIGS. 2 and 3, the user interface (111) of the electronic device includes only the display 102 and the touch sensor 112. No other buttons or controls are included, thereby providing a sleek and seamless appearance. Additionally, the electronic device 100 can be waterproof, as noted above.

Figure 5:
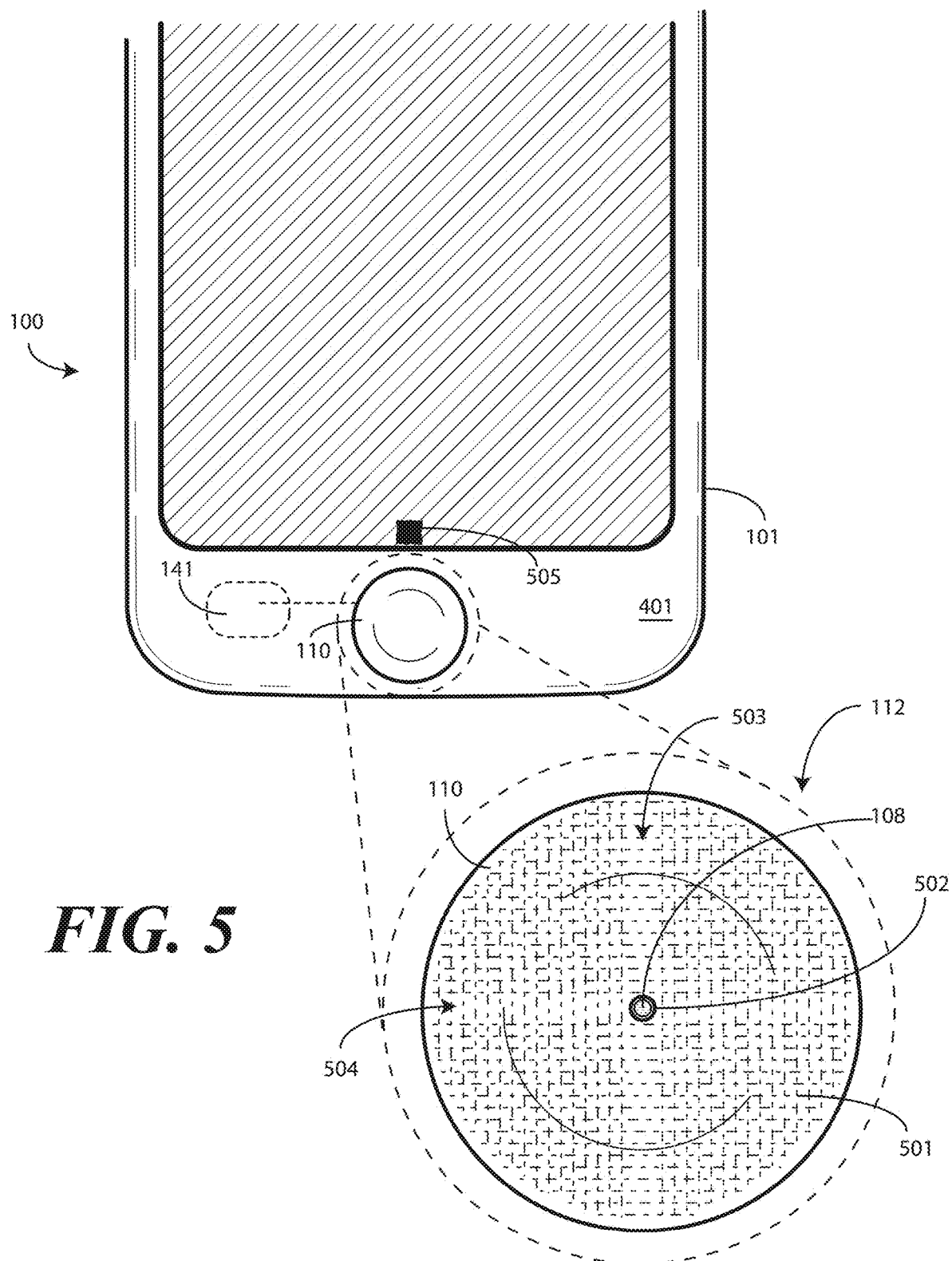

Turning now to FIGS. 4-5, in another embodiment the touch sensor 112 can include a fingerprint sensor 110 and a proximity sensor component 108 that is concentrically located with the fingerprint sensor 110. Embodiments of the disclosure contemplate that it can be advantageous to place a fingerprint sensor 110 under a continuous glass or sapphire fascia 401 of an electronic device 100, as doing so improves the overall appearance, prevents the ingress of liquids and other materials, and reduces cost. Accordingly, there may be applications in which a thermally conductive band (301) will not be included. For this reason, the embodiment of FIGS. 4-5 concentrically locates the proximity sensor component 108 with the fingerprint sensor 110 beneath the fascia 401 to provide a clean, smooth appearance. The inclusion of the proximity sensor component 108 with a fingerprint sensor 110 offers to capability of verifying that an actual finger is touching the fingerprint sensor 110 rather than another object.

In one embodiment, the proximity sensor component 108 and fingerprint sensor 110 combination is simply disposed beneath the fascia 401 of the electronic device 100. As such, the fascia 401 defines a thermal conduit between a surface of the electronic device 100 and the proximity sensor component 108. Where so configured, the fascia 401 transfers thermal energy, by functioning as a heat conductor, from a user's finger when it touches the fascia 401.

In another embodiment, the fascia 401 can define a small hole or aperture 502 to allow thermal energy to pass directly to the proximity sensor component 108. In one embodiment, the aperture 502 can be concentrically located with the proximity sensor component 108. Here, the aperture 502 is axially aligned with the proximity sensor component 108 along the Z-axis running into and out of the page.

In one embodiment, this aperture 502 is less than 0.2 millimeters in diameter. The inclusion of the aperture 502 is possible due to the fact that the plurality of sensors 501 are separated from the processor 141 of the fingerprint sensor 110. The inclusion of the aperture 502 advantageously allows the proximity sensor component 108 to detect an approaching finger from farther distances.

Where the aperture 502 is included, it can define an acoustic port for the audio output device (113) as previously described. Additionally, where it is desirable to make the electronic device 100 waterproof, the aperture 502 can optionally be covered with a thermally transmissive film layer as previously described.

As best shown in FIG. 5, in one or more embodiments the fingerprint sensor 110 comprises a plurality of sensors 501 disposed along a surface of the fingerprint sensor 110. For example, in one embodiment the plurality of sensors 501 comprise indium-tin oxide electrical conductors that are deposited along a surface of the fingerprint sensor. Where the proximity sensor component 108 is concentrically located with the fingerprint sensor 110, in one or more embodiments the plurality of sensors 501 surrounds the proximity sensor component 108.

In this illustrative embodiment, the plurality of sensors 501 have been modified by removing six or fewer horizontal and vertical sensor lines that would pass across the proximity sensor component 108 to define a vertical sensorless channel 503 and a horizontal sensorless channel 504. In one embodiment, since the sensor line spacing is roughly fifty micrometers, this results in the vertical sensorless channel 503 and the horizontal sensorless channel 504 having a width of 300 micrometers or less. Simulations demonstrate that the vertical sensorless channel 503 and the horizontal sensorless channel 504 account for less than ten percent of the fingerprint sensor area, so the elimination of these lines to accommodate the proximity sensor component 108 can be compensated by additional sensing algorithms performed by the processors 141 of the fingerprint sensor 110.

The proximity sensor component 108 then is able to sense the temperature of a finger touching the fascia 401 at the touch sensor 112. This provides several benefits: First, the touch sensor 112 is able to verify that a live finger is touching the touch sensor 112 area when the proximity sensor component 108 detects thermal energy from the finger. Second, security is enhanced because the proximity sensor component's detection of the thermal energy increases confidence in the identification of the user based on thermography. Third, the concentric location of the fingerprint sensor 110 and the proximity sensor component 108 allows the user to interact with only a single touch sensor 112, thereby allowing the user to more naturally interact with the touch sensor 112.

In either the embodiment of FIGS. 2-3 or the embodiment of FIGS. 4-5, an optional infrared transmitter 505 can be included beneath the fascia 401. While the proximity sensor component 108 can comprise a signal receiver such as an infrared photodiode to detect an infrared emission from an object external to the housing 101 of the electronic device 100, the infrared transmitter 505 can comprise a signal emitter that transmits a beam of infrared light that reflects from a nearby object and is received by the proximity sensor component 108 through the aperture 502. Where the infrared transmitter (505) is included, it can be used, for example, to compute the distance to any nearby object from characteristics associated with the reflected signals.

It should be noted that while FIGS. 2-5 illustrate some possible configurations for proximity sensor components 108 and fingerprint sensors 110, others would be obvious to those of ordinary skill in the art having the benefit of this disclosure. For example, proximity sensor components 108 can be disposed about a perimeter of the fingerprint sensor 110, immediately adjacent to the fingerprint sensor 110 with sides of the single proximity sensor component 108 and the fingerprint sensor abutting, or adjacent to the fingerprint sensor 110 with one being separated from the other by a millimeter or two. Moreover, rather than a single proximity sensor component a plurality of proximity sensor components can be used in conjunction with a fingerprint sensor. Accordingly, while FIGS. 2-5 included only a single proximity sensor component 108, they could have included multiple proximity sensor components as well. Also, the embodiments of FIGS. 2-5 are explanatory only, as others will be obvious to those of ordinary skill in the art having the benefit of this disclosure.

Turning now to FIG. 6, illustrated therein a functional diagram 400 indicating which functions occur where the fingerprint sensor 110 is operating in conjunction with one or more proximity sensor components 108 in one or more embodiments of the disclosure. In this embodiment, the proximity sensor component 108 comprises an infrared signal receiver proximately located with the fingerprint sensor 110, such as being collocated with a thermally conductive band (301) or concentrically located with the fingerprint sensor 110.

The proximity sensor component 108 is operable to detect objects 608 external to the housing of an electronic device by receiving infrared emissions. When this occurs, the proximity sensor component 108 can transition 609 the fingerprint sensor 110 from a low power or sleep mode to an active mode of operation. Additionally, the proximity sensor component 108 can initiate 610 a timer when the infrared signal receiver receives the infrared emission.

The fingerprint sensor 110 can then capture 603 and store fingerprint data from a finger coming into contact with the fingerprint sensor 110. The fingerprint sensor 110 can optionally pre-process 604 the fingerprint data. Examples of capturing and pre-processing steps include monitoring 602 the fingerprint sensor 110 to detect a finger proximately located with the fingerprint sensor 110 and capturing 603 fingerprint data. The capturing and pre-processing steps can also include noise filtering or other pre-processing steps.

The capturing and pre-processing steps can further include validating 605 whether an object proximately located with the fingerprint sensor 110 is actually a finger rather than another inanimate object such as a key ring, lipstick case, or other object. The capturing and pre-processing steps can also include image validation 606. The image validation 606 can include determining if the fingerprint data is of sufficient quality so as to successfully make it through the matching and control steps occurring in either the one or more processors (116) of the electronic device or a processor (141) of the fingerprint sensor 110. In other embodiments, where multiple sets of the fingerprint data exists, the image validation 606 can include comparing the second object or fingerprint data to primary object or fingerprint data and deleting a lesser quality one of the second object or fingerprint data and the primary object or fingerprint data.

In some situations, the proximity sensor component 108 will cause the fingerprint sensor 110 to enter the active mode. However, no finger will touch the fingerprint sensor 110. Such a situation can arise where a user waves their hand near the device without touching it. The proximity sensor component will receive infrared emissions, but the user will not touch the fingerprint sensor 110. (Note that these infrared emissions can be interpreted as gesture inputs in other embodiments.) Accordingly, when the proximity sensor component 108 initiates the timer, and where the fingerprint sensor fails to capture and store fingerprint data prior to expiration of the timer, the proximity sensor component 108, or one or more processors operational therewith, can transition 611 the fingerprint sensor 110 from the active mode to the low power or sleep mode. The fingerprint sensor 110 can then operate in the low power or sleep mode until the proximity sensor component detects another warm object by receiving infrared emissions.

As noted above, in one or more embodiments the at least one proximity sensor component 108 can actuate the fingerprint sensor 110 upon receiving an infrared emission from an object external to the housing. Turning now to FIGS. 7-12, illustrated therein are methods for doing so.

Figure 7:
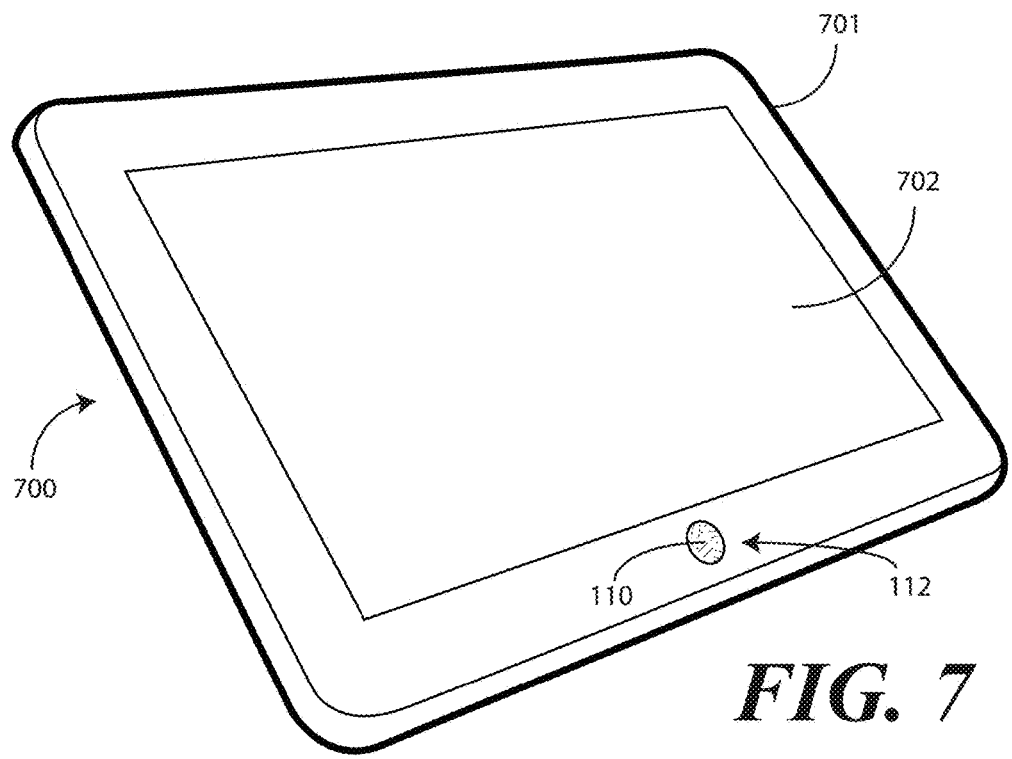
FIG. 7 illustrates one explanatory electronic device in accordance with one or more embodiments of the disclosure.

Beginning with FIG. 7, an electronic device 700 has entered a low power or sleep mode. This can occur when a user does not interact with the electronic device 700 for a predefined period of time. When in this mode, the display 702 is blank as the one or more processors have entered a low power or sleep mode. When this occurs, in one embodiment the fingerprint sensor 110 of the touch sensor 112 is also placed into a low power or sleep mode to conserve power. However, one or more proximity sensor components (108) of the touch sensor 112 are in their active mode of operation to detect objects external to the housing 701 of the electronic device 700 by receiving infrared emissions.

Figure 8:
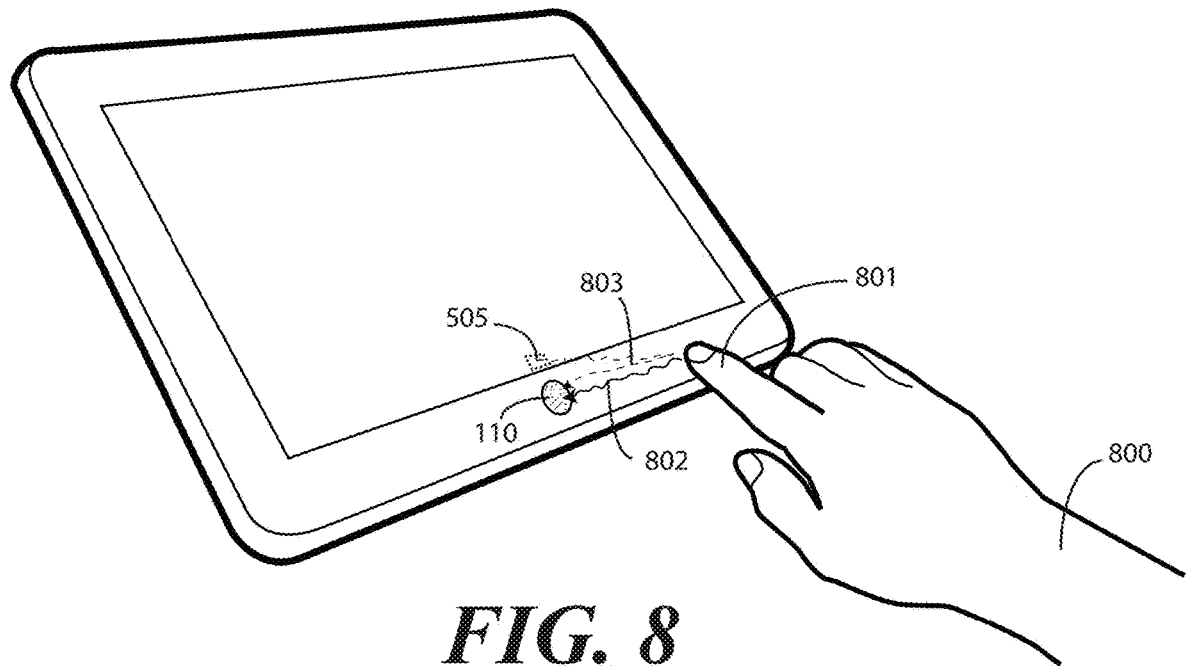
FIG. 8 illustrates one or more explanatory method steps using an electronic device in accordance with one or more embodiments of the disclosure.

Turning now to FIG. 8, a user 800 has a finger 801 near the proximity sensor component (108). As the finger 801 is a warm object, it delivers an infrared emission 802 to the proximity sensor component (108). Where an infrared transmitter 505 is included, reflections 803 may be delivered to the proximity sensor component (108). Accordingly, the proximity sensor component (108) transitions the fingerprint sensor 110 from a low-power or sleep mode to an active mode.

In addition to waking the fingerprint sensor 110, the proximity sensor component (108) can perform other operations as well. Illustrating by example, in one embodiment the proximity sensor component (108) can optionally can wake the one or more processors (116) of the electronic device (700), thereby transitioning the electronic device (700) to an active mode of operation. In another embodiment, the proximity sensor component (108) can optionally wake the display (102) so that it is active when the user touches the electronic device (700) or display (102). Other actions will be obvious to those of ordinary skill in the art having the benefit of this disclosure.

Figure 9:
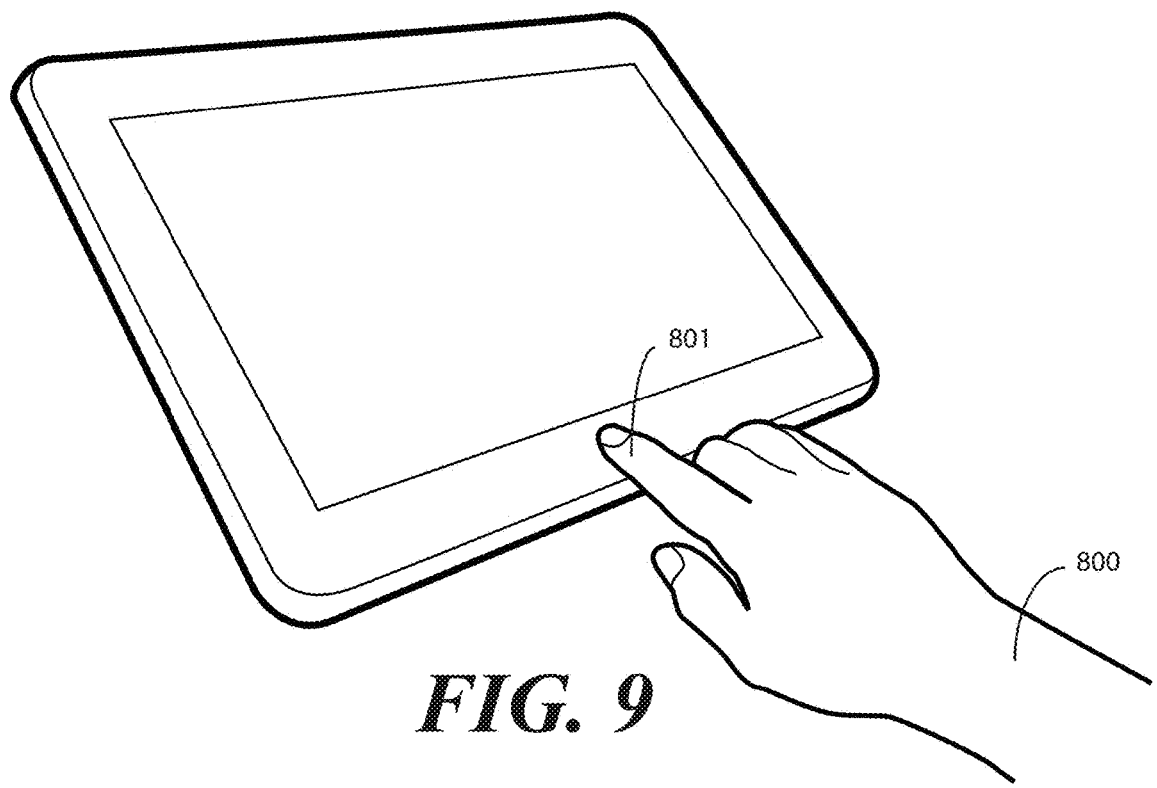
FIG. 9 illustrates one or more explanatory method steps using an electronic device in accordance with one or more embodiments of the disclosure.

Turning to FIG. 9, the user 800 places the finger 801 against the fingerprint sensor (110). Accordingly, the fingerprint sensor (110) captures and store fingerprint data from the finger 801 when in the active mode. In one embodiment, the fingerprint sensor (110) first confirms the finger 801 is actually a finger. Where this is the case, the process of authenticating the user 800 begins. One of several options can occur: First, authentication can be successful. Where this is the case, the fingerprint sensor (110) can wake the one or more processors (116) of the electronic device 700, transitioning the electronic device 700 to an active mode of operation. Alternatively, authentication can be unsuccessful. Where this is the case, the fingerprint sensor (110) can return to the low-power or sleep mode until the proximity sensor component (108) detects another object. In a third case, the user may be unidentified, but the one or more processors (116) may be actuated nonetheless so that the user can authenticate themselves by other techniques, such as by entering a personal identification number. In one embodiment, once the user is authenticated, if the electronic device 700 remains in an active state, i.e., is not left resting on a table or other surface, the user will remain authenticated as it is presumed that the constant motion of the active state results from the electronic device 700 being continually held by the user.

Figure 10:
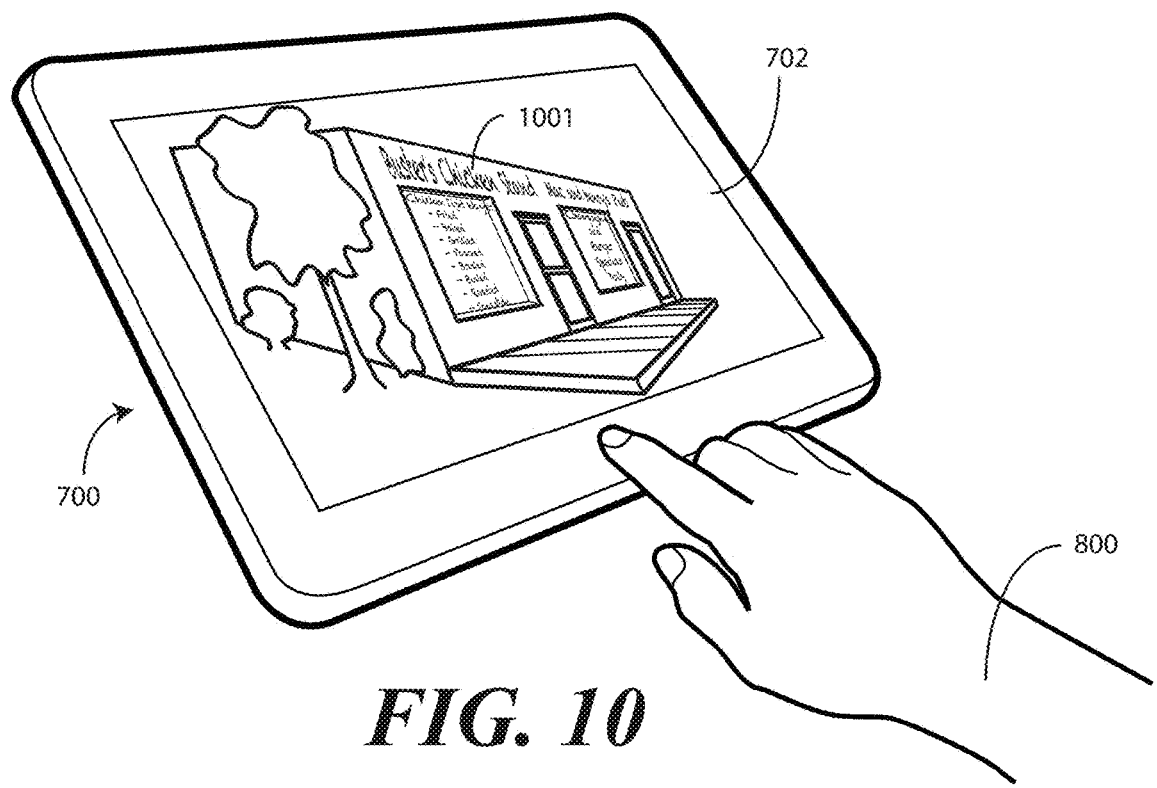
FIG. 10 illustrates one or more explanatory method steps using an electronic device in accordance with one or more embodiments of the disclosure.

Turning to FIG. 10, the authentication in this example has been successful. As such, the one or more processors (116) transition to an active mode and the display 702 becomes active. Here, the user 800 is thus able to look at a picture 1001 of a new restaurant they want to try, Buster's Chicken Shack.

Figure 11:
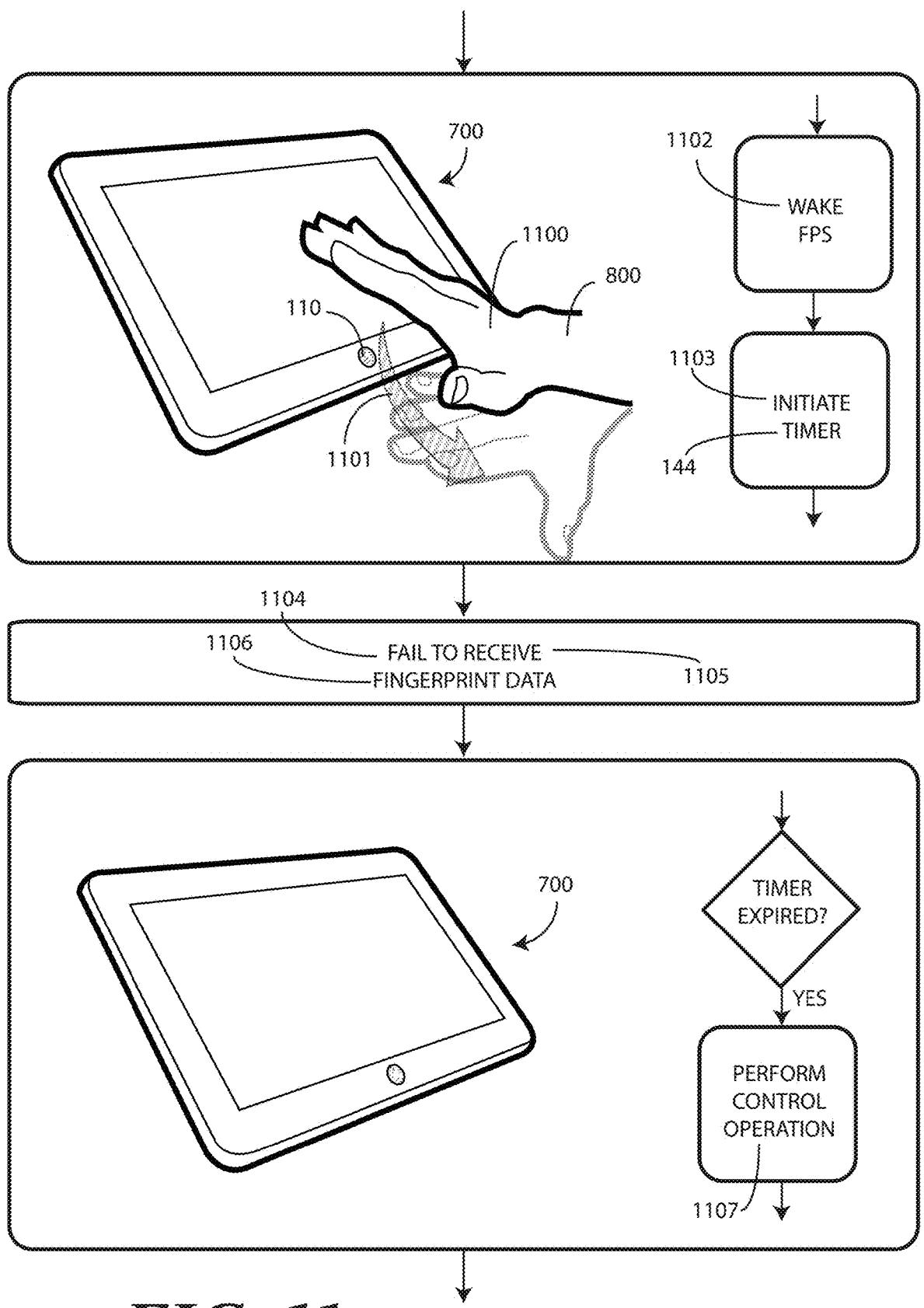
FIG. 11 illustrates one or more explanatory method steps using an electronic device in accordance with one or more embodiments of the disclosure.

Turning to FIG. 11, in this example the user 800 merely swipes 1101 their hand 1100 over the electronic device 100. Perhaps the user 800 is delivering gesture input to the electronic device 700, such as to cause the electronic device 700 to capture a picture with a built-in camera. Perhaps the swipe 1101 is accidental. In either event, the proximity sensor component (108) of the touch sensor 112 receives an infrared emission from the hand 1100. Accordingly, the proximity sensor component (108) wakes 1102 the fingerprint sensor 110 from the low-power or sleep mode. A timer 144 is also initiated 1103.

However, the user 800 never touches the fingerprint sensor 110. Accordingly, the fingerprint sensor 110 fails 1104 to receive 1105 fingerprint data 1106 prior to expiration of the timer 144. In one embodiment, one of the proximity sensor component (108) or the one or more processors (116) of the electronic device 700 therefore perform a control operation 1107. In one embodiment, the control operation 1107 comprises placing the fingerprint sensor 110 back in the low power or sleep mode.

Figure 12:
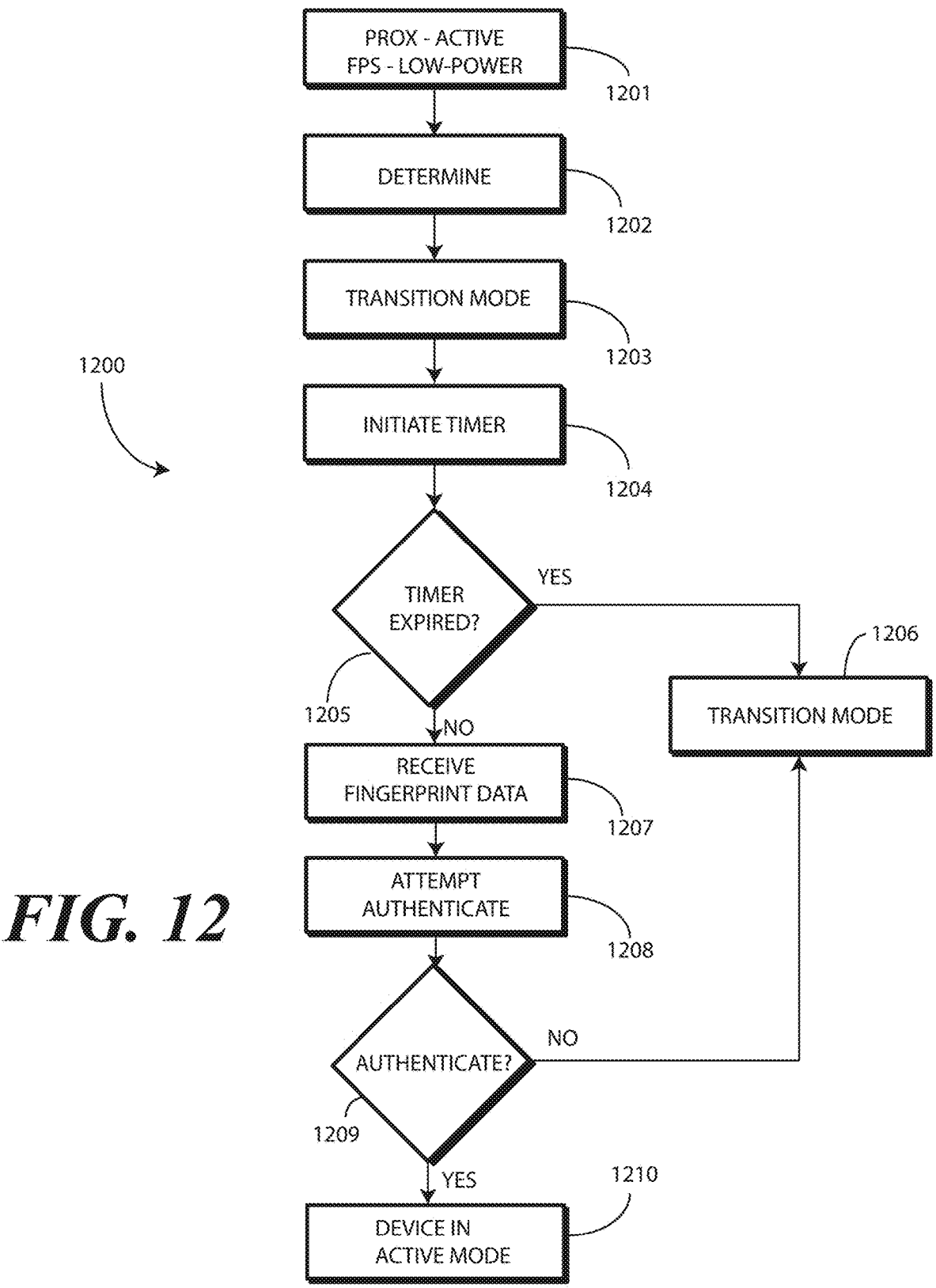
FIG. 12 illustrates one explanatory method in accordance with one or more embodiments of the disclosure.
Figure 13:
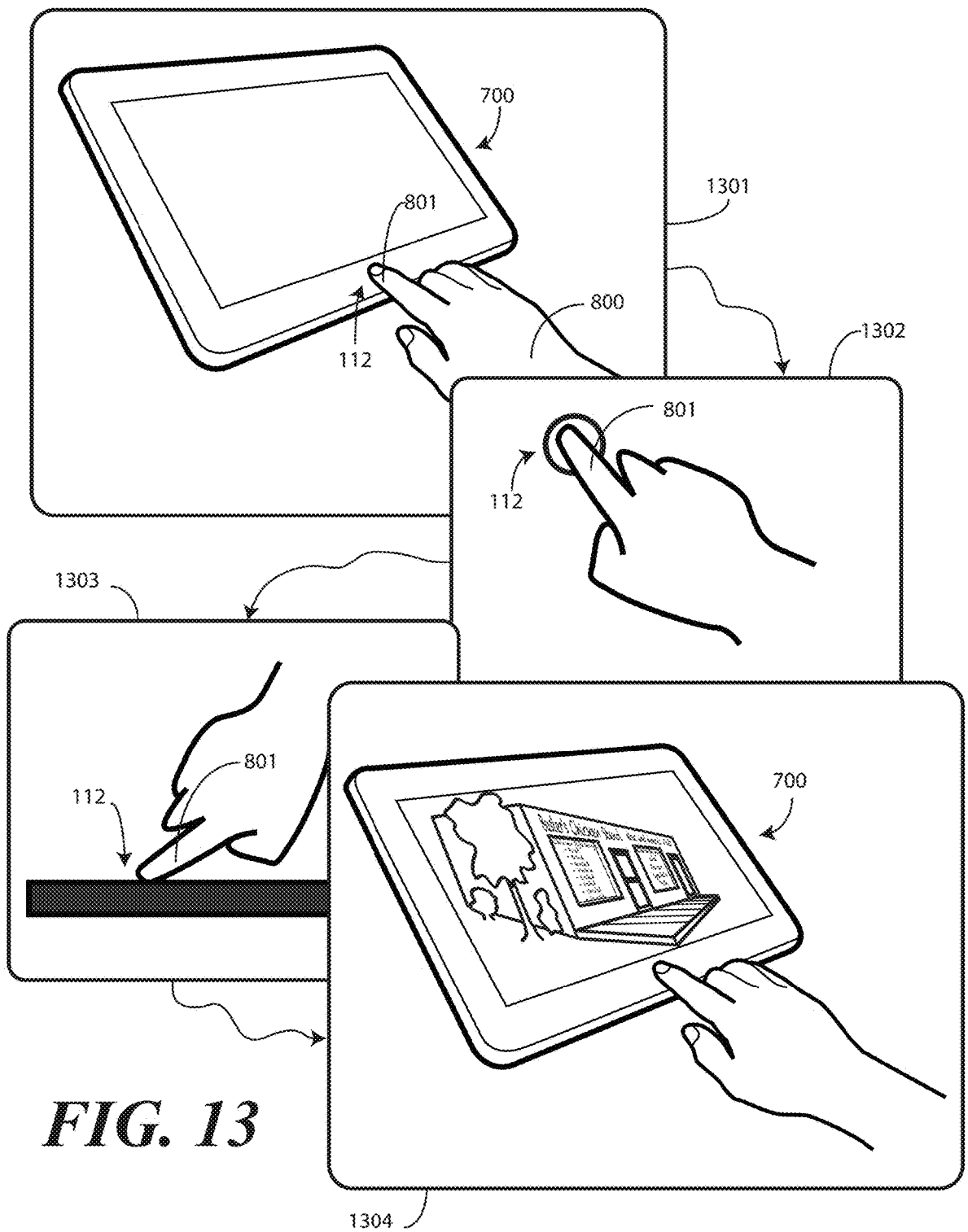
FIG. 13 illustrates one explanatory method of controlling an electronic device in accordance with one or more embodiments of the disclosure.

Turning now to FIG. 12, illustrated therein is one explanatory method 1200 for operating an electronic device in accordance with one or more embodiments of the disclosure. At step 1201, the method 1200 includes operating at least one proximity sensor component in an active mode while a fingerprint sensor is in the low-power or sleep mode.

At step 1202, the method 1200 includes determining, with at least one proximity sensor component proximately located with a fingerprint sensor, a proximity of the object to the fingerprint sensor. In one embodiment, the at least one proximity sensor component comprises an infrared signal receiver to receive an infrared emission from an object external to a housing.

In one embodiment, the infrared signal receiver detects the object at step 1202 when the proximity of the object is less than a predetermined distance from a housing of the electronic device. One example of such a predetermined distance would be less than three inches from the housing. Other examples of predetermined distances will be obvious to those of ordinary skill in the art having the benefit of this disclosure.

At step 1203, and in response to detecting the proximity of the object, the method 1200 can transition the fingerprint sensor from a low power or sleep mode to an active mode of operation.

At optional step 1204, the method 1200 can include initiating a timer in response to the at least one proximity sensor component detecting the object at step 1202. In another embodiment, the method 1200 initiates the timer at step 1204 when the object is less than the predetermined distance from the fingerprint sensor.

At optional decision 1205, the method checks to see whether the timer has expired without the fingerprint sensor receiving fingerprint data. Where this is the case, i.e., where the fingerprint sensor fails to capture fingerprint data prior to expiration of the timer, the method 1200 can return the fingerprint sensor to the low power or sleep mode at step 1206.

At step 1207, the method 1200 can receive, with the fingerprint sensor, fingerprint data. At step 1208, the method 1200 can attempt to authenticate the fingerprint data.

At decision 1209, the method 1200 can determine whether the fingerprint data is authenticated. Where it is, the method 1200 can transition the electronic device to an active mode of operation at step 1210. However, at step 1206 the method 1200 can return the fingerprint sensor to the low power or sleep mode upon failing to authenticate the fingerprint data.

As noted above, in one or more embodiments, the touch sensor 112 can also detecting an action of the object along the fingerprint sensor 110. When this occurs, one or more processors can perform a control operation as a function of the action. Advantageously, the touch sensor 112 can reacts to a live user's temperature, through infrared emissions, as opposed to only acting in response to physical touch. Accordingly, the touch sensor 112 can assess swipe gestures as well as touch input. Embodiments of the disclosure therefore offer early and seamless fingerprint sensor engagement with an approaching finger. Embodiments of the disclosure conserve considerable power, and also reduce false actuation of the fingerprint sensor 110 since the inclusion of the proximity sensor component (108) causes the fingerprint sensor 110 to respond to a warm body rather than inanimate objects such as keychains.

Turning now to FIGS. 13-16, illustrated therein are methods for using a touch sensor 112 comprising a fingerprint sensor 110 and a proximity sensor component (108) as configured in either FIGS. 3-4 or FIGS. 4-5. Beginning with FIG. 13, a user 800 touches a touch sensor 112 with their finger 801 at step 1301. The electronic device 700 is initially OFF. The proximity sensor component (108) detects the approaching finger 801, and wakes the fingerprint sensor (110) from a low-power state. The proximity sensor component (108) saturates when the finger 801 contacts the fingerprint sensor (110), and the fingerprint sensor (110) authenticates the user 800 as previously described.

After authentication, as shown at steps 1301,1302, the user's finger 801 is then stationary on the touch sensor 112 for a predetermined duration, such as five or six seconds. When this occurs, one or more processors of the electronic device 700 interpret this as user input requesting that the electronic device 700 power ON. Accordingly, at step 1304, the electronic device 700 powers ON. It should be noted that these steps 1301,1302,1303,1304 could be executed in reverse order, with the user input requesting that the electronic device 700 power OFF as well.

Figure 14:
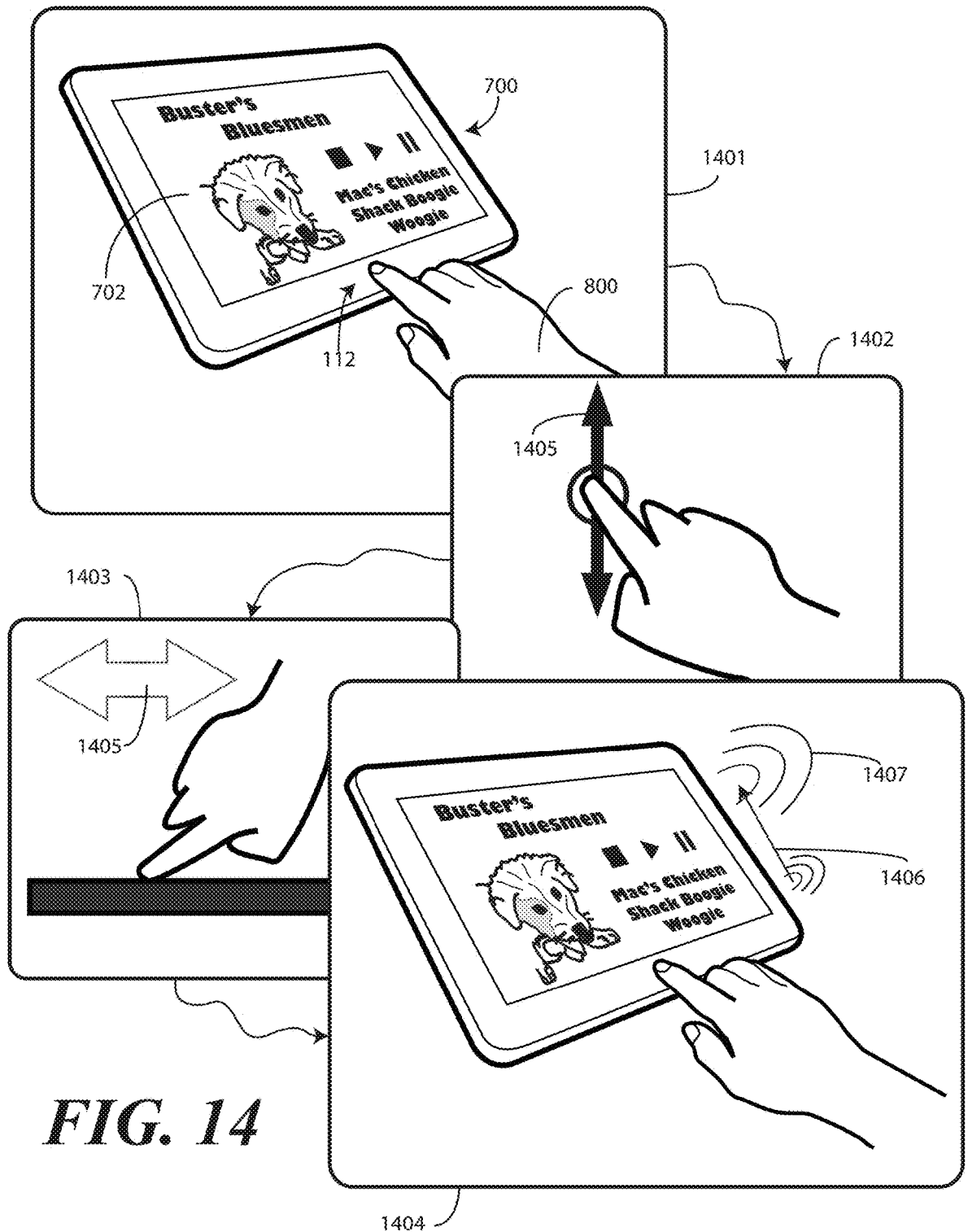
FIG. 14 illustrates another explanatory method of controlling an electronic device in accordance with one or more embodiments of the disclosure.

Turning now to FIG. 14, at step 1401 the user 800 is listening to "Mac's Chicken Shack Boogie Woogie" by the legendary band Buster's Bluesmen. At step 1401 the electronic device 700 is ON and operational, and so the authentication feature provided by the touch sensor 112 is deactivated. Since the electronic device 700 includes no buttons, and instead includes a user interface consisting essentially of the touch sensor 112 and the touch-sensitive display 702, the touch sensor 112 can now be used as a control device in accordance with one or more embodiments of the disclosure. At step 1401, the touch sensor detects, with either the fingerprint sensor 110 or the proximity sensor component (108), the user's finger 801 touching the touch sensor 112.

As shown at steps 1402-1403, the touch sensor then detects, an action 1405 of the finger 801 along the fingerprint sensor 110. In this illustrative embodiment, the action 1405 is movement of the finger 801 along the fingerprint sensor 110 in a first direction. In this embodiment, the first direction is vertical. Said differently, of the display 702 of the electronic device 700 defines an X-Y plane, with the X-axis defining a horizontal axis parallel to the words "Buster's Bluesmen," the Y-axis is oriented orthogonal to the X-axis. In this illustrative embodiment, when the action 1405 comprises movement along the Y-axis, the control operation comprises adjusting 1406 the volume 1407 of an audio output of the electronic device as shown at step 1404.

Figure 15:
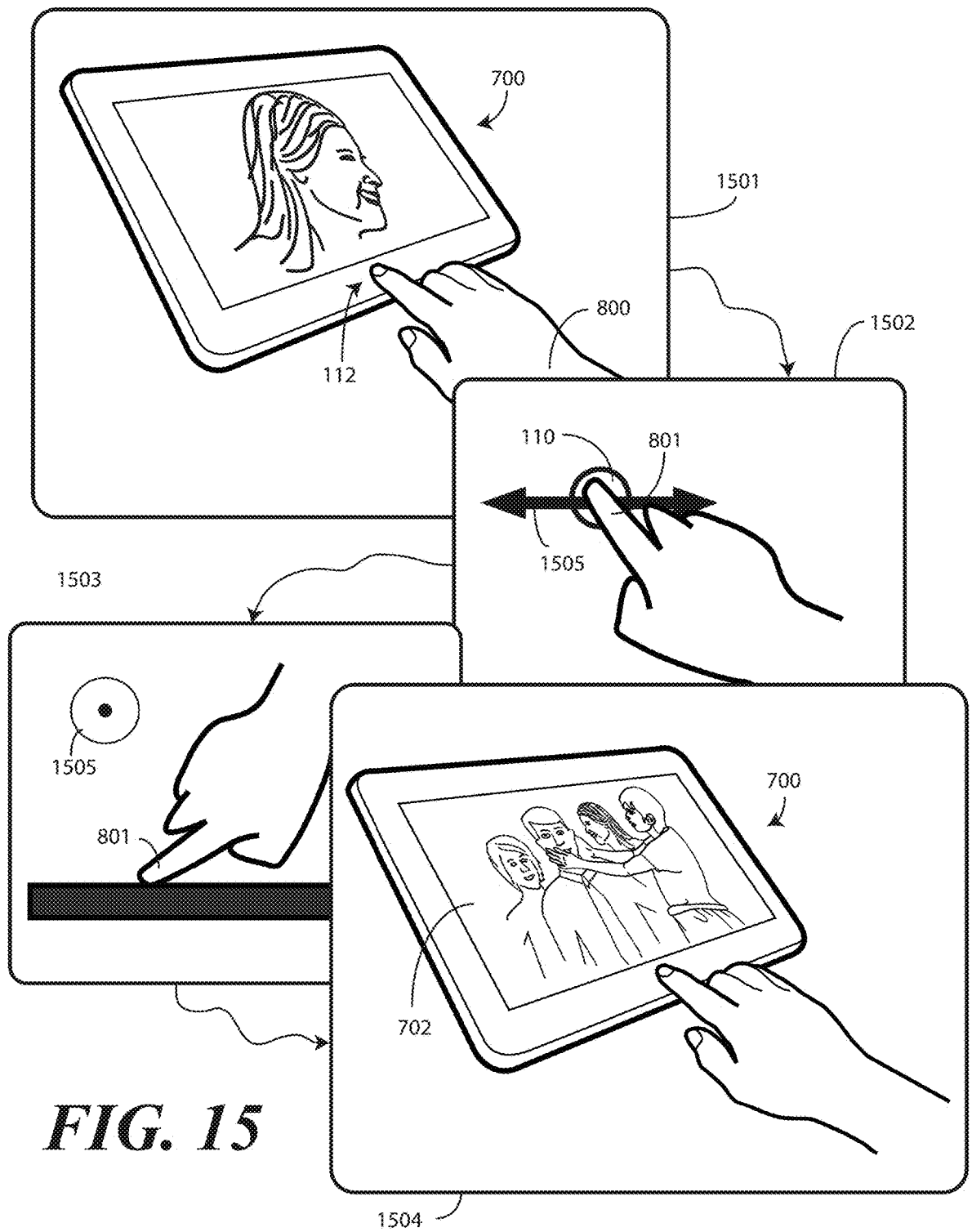
FIG. 15 illustrates yet another explanatory method of controlling an electronic device in accordance with one or more embodiments of the disclosure.

In contrast with the action 1405 of FIG. 14, in FIG. 15, the action 1505 is horizontal, i.e., along the X-axis. Beginning with step 1501, the user 800 is looking at a picture of his friend, Kayla. The electronic device 700 is ON and operational, and so the touch sensor 112 can now be used as a control device in accordance with one or more embodiments of the disclosure. At step 1501, the touch sensor detects, with either the fingerprint sensor 110 or the proximity sensor component (108), the user's finger 801 touching the touch sensor 112.

As shown at steps 1502-1503, the touch sensor then detects, an action 1505 of the finger 801 along the fingerprint sensor 110. In this illustrative embodiment, the action 1505 is movement of the finger 801 along the fingerprint sensor 110 in a second direction, which is different from the first direction. In this embodiment, the second direction is horizontal. In this illustrative embodiment, when the action 1505 comprises movement along the X-axis, the control operation comprises a panning swipe to alter a presentation on a display 702 of the electronic device 700. As shown at step 1504, the presentation has been adjusted by changing the picture of Kayla to a picture of the user's family.

It should be noted that while volume adjustment and panning swipes are two illustrative examples of control operations that can be performed in response to detecting actions, embodiments of the disclosure are not so limited. Numerous other operations can be substituted. Moreover, those control operations can be context specific, and can change as a function of the operating mode of the electronic device. For example, if the electronic device is operating in an image capture mode, the control operation may be zooming in on an object or zooming out from an object. Other control operations will be obvious to those of ordinary skill in the art having the benefit of this disclosure.

Figure 16:
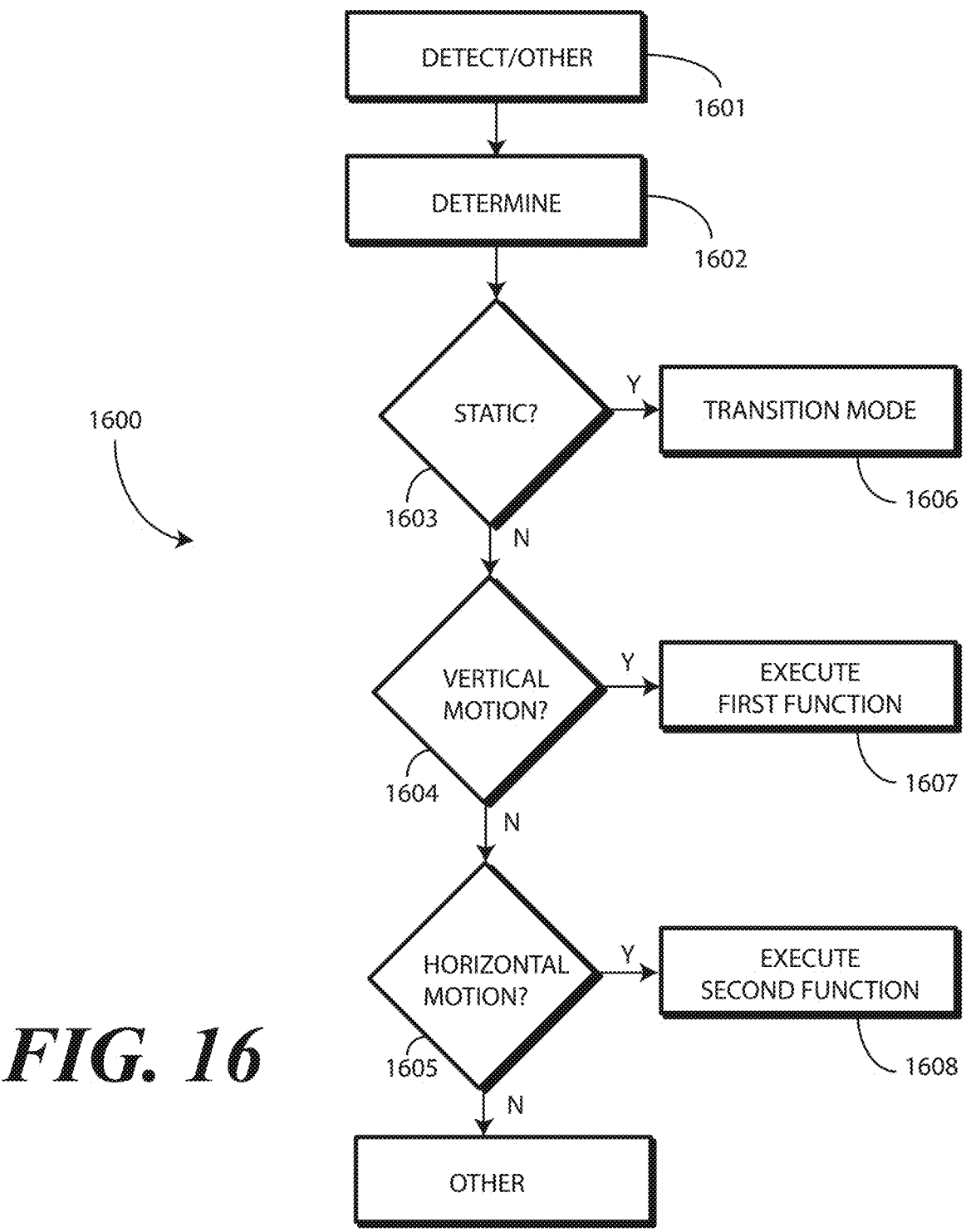
FIG. 16 illustrates another explanatory method in accordance with one or more embodiments of the disclosure.

Turning now to FIG. 16, illustrated therein is one method 1600 that describes the operation illustrated above with reference to FIGS. 13-15. At step 1601, the method 1600 determines, with a touch sensor including at least one proximity sensor component proximately located with a fingerprint sensor, that an object such as a user's finger is proximately located with the fingerprint sensor. For example, when the user's finger is approaching the touch sensor, the at least one proximity sensor component can detect this by receiving thermal energy in the form of infrared transmissions from the user's finger. In one or more embodiments, step 1601 comprises receiving, with the proximity sensor component, thermal energy from the object through a thermally conductive band circumscribing the fingerprint sensor. In one or more embodiments when this occurs, step 1601 also comprises, in response to the determining, transitioning the fingerprint sensor from a low-power or sleep mode to an active mode of operation. Step 1601 can also include authenticating the user as previously described.

At step 1602, the method 1600 includes detecting, with either the fingerprint sensor or the proximity sensor component, that the object is touching the fingerprint sensor. Step 1602 can also include detecting, with the fingerprint sensor, an action of the object along the fingerprint sensor. What the action may be is determined at decisions 1603, 1604,1605. Depending upon the action, at steps 1606,1607, 1608 the method 1600 can perform a control operation as a function of the action.

For example, at decision 1603, the method 1600 can determine whether the action comprises the object remaining stationary for at least a predetermined duration. Where this occurs, at step 1606 the control operation can comprise one of powering the electronic device OFF or ON.

At decision 1604, the method 1600 can determine whether the action comprises movement of the object along the fingerprint sensor in a first direction. Where this occurs, at step 1607 the control operation can comprise adjusting a volume of an audio output of the electronic device.

At decision 1605, the method 1600 can determine whether the action comprises movement of the object along the fingerprint sensor in a second direction. Where this occurs, at step 1608 the control operation can comprise a panning operation to alter a presentation on a display of the electronic device.

In the methods set forth in FIGS. 13-16, once the user has been authenticated and the device is active, the authentication function of the fingerprint sensor can be deactivated so that the fingerprint sensor can be used to detect actions, each of which includes touching the fingerprint sensor. However, embodiments of the disclosure are not so limited. Since there is a proximity sensor component in the touch sensor, it can be used for gesture input once the user has been authenticated and the device is active. This additional advantage of embodiments of the disclosure is shown in FIG. 17.

Figure 17:
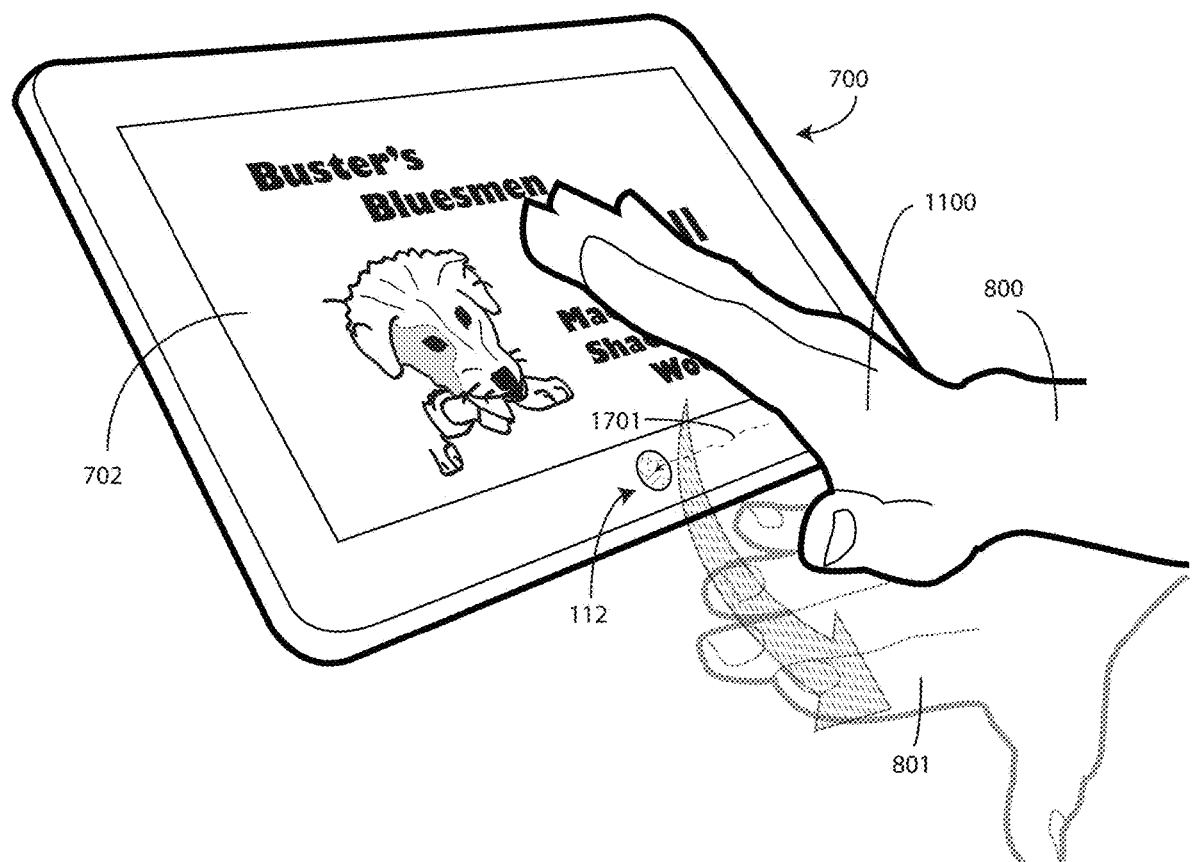
FIG. 17 illustrates still another explanatory method of controlling an electronic device in accordance with one or more embodiments of the disclosure.

Turning now to FIG. 17, the electronic device 700 is ON and the user 800 has already been authenticated. Accordingly, the proximity sensor component (108) of the touch sensor 112 can be used for gesture input in one or more embodiments. As shown in this example, the user 800 is waving a hand 1100 above a major face of the electronic device 700. The user's hand 1100 delivers an infrared emission 1701 to the proximity sensor component (108) of the touch sensor 112.

In one or embodiments, one or more processors of the electronic device 700 can identify the infrared emission 1701 as user input. For example, a gesture in the vertical direction may adjust the volume of Buster signing the blues, while a gesture in the horizontal direction may serve as play/pause control. The one or more processors can detect this user input by receiving the infrared emission 1701 and can then execute a different control operation than that executed, for example, in any of FIGS. 13-15. By placing a finger 801 on the proximity sensor component (108), the user 800 can cause the signal delivered to the proximity sensor component (108) to saturate to deliver touch input as well in one or more embodiments.

Other methods and techniques of delivering user input to an electronic device 700 having a user interface that comprises only a touch-sensitive display 702 and a touch sensor 112 will be obvious to those of ordinary skill in the art having the benefit of this disclosure. For example, the proximity sensor component (108) may be able to detect the distance to an object by determining the strength of received infrared emissions. Accordingly, a user may be able to cause a camera application to zoom in and zoom out by moving the electronic device 700 closer and farther from their head. The user may then be able to make a gesture command by waving their hand 1100 to cause an imager to capture an image.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   placing a fingerprint sensor in a low power or sleep mode;
   while the fingerprint sensor is in the low power or sleep mode, maintaining one or more proximity sensor components in an active mode of operation;
   receiving, with the one or more proximity sensor components, an infrared emission reflected from an infrared transmitter disposed beneath a fascia of the electronic device and collocated with a display of the electronic device;
   in response to the receiving, transitioning the fingerprint sensor from the low power or sleep mode to the active mode of operation;
   capturing, with the fingerprint sensor, fingerprint data;
   attempting, with one or more processors, to authenticate the fingerprint data; and
   where authentication is unsuccessful, returning the fingerprint sensor to the low power or sleep mode until the one or more proximity sensor components receive another infrared emission; and
   wherein the one or more proximity sensor components receiving the infrared emission reflected from an infrared transmitter is collocated with a thermally conductive band circumscribing the fingerprint sensor.

2. The method of claim 1, further comprising performing a control operation where the authentication is successful.

3. The method of claim 2, the control operation comprising transitioning one or more processors to the active mode of operation.

4. The method of claim 2, the control operation comprising transitioning the display to the active mode of operation.

5. The method of claim 4, the control operation further comprising presenting a picture on the display.

6. A method in an electronic device, the method comprising:
   detecting, with a proximity sensor component, gesture input by receiving an infrared emission from the gesture input;
   in response to the receiving by the proximity sensor component, transitioning a fingerprint sensor from a low power or sleep mode to an active mode of operation;
   initiating a timer;
   failing, with the fingerprint sensor, to receive fingerprint data prior to expiration of the timer; and
   upon expiration of the timer, returning the fingerprint sensor to the low power or sleep mode until the proximity sensor component receive another infrared emission;
   wherein the proximity sensor component detecting the gesture input is collocated with a thermally conductive band circumscribing the fingerprint sensor.

7. The method of claim 6, further comprising performing, with one or more processors, a control operation in response to expiration of the timer.

8. The method of claim 6, wherein the initiating of the timer occurs only when an object is less than a predetermined distance from the fingerprint sensor.

9. The method of claim 6, further comprising causing the fingerprint sensor to attempt to receive the fingerprint data prior to expiration of the timer.

10. The method of claim 1, wherein the one or more proximity sensor components receiving the infrared emission reflected from the infrared transmitter are situated beside the display.

11. The method of claim 10, wherein the one or more proximity sensor components receiving the infrared emission reflected from the infrared transmitter are collocated with the fingerprint sensor.

12. The method of claim 11, the fascia defining an aperture allowing the infrared emission reflected from the infrared transmitter to pass through the aperture to the one or more proximity sensor components, wherein the one or more proximity sensor components are concentrically located with the aperture.

13. The method of claim 12, wherein the fingerprint sensor is concentrically located with the aperture.

14. The method of claim 6, the thermally conductive band defining at least one aperture, the proximity sensor component collocated with the at least one aperture.

15. The method of claim 14, the thermally conductive band defining a thermal conduit between a surface of the thermally conductive band and the proximity sensor component.

16. The method of claim 1, the fascia defining an aperture allowing the infrared emission reflected from the infrared transmitter to pass through the aperture to the one or more proximity sensor components.

17. The method of claim 16, wherein the one or more proximity sensor components are concentrically located with the aperture.

18. The method of claim 1, further comprising, in response to the receiving, activating the display of the electronic device.

19. The method of claim 1, further comprising confirming, with the fingerprint sensor, that a finger is proximately located with the fingerprint sensor.

20. The method of claim 1, further comprising determining, with the one or more proximity sensor components, whether the infrared emission are received from an object within a predefined distance from a housing of the electronic device.

* * * * *